United States Patent
Kinoshita et al.

(10) Patent No.: US 8,313,849 B2
(45) Date of Patent: *Nov. 20, 2012

(54) BIAXIALLY ORIENTED LAMINATED FILM

(75) Inventors: Eiji Kinoshita, Gifu (JP); Mitsuo Tojo, Gifu (JP); Makoto Handa, Gifu (JP); Takeshi Ishida, Gifu (JP)

(73) Assignee: Teijin Limited, Osaka-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/988,999

(22) PCT Filed: Apr. 21, 2009

(86) PCT No.: PCT/JP2009/058234
§ 371 (c)(1),
(2), (4) Date: Oct. 21, 2010

(87) PCT Pub. No.: WO2009/131236
PCT Pub. Date: Oct. 29, 2009

(65) Prior Publication Data
US 2011/0039127 A1 Feb. 17, 2011

(30) Foreign Application Priority Data

Apr. 21, 2008 (JP) ................................ 2008-110101
Apr. 21, 2008 (JP) ................................ 2008-110102
Feb. 26, 2009 (JP) ................................ 2009-043840

(51) Int. Cl.
*G11B 5/706* (2006.01)
*C08G 77/04* (2006.01)

(52) U.S. Cl. .................. 428/847.4; 428/480; 428/847.8; 528/176

(58) Field of Classification Search .................. 428/838, 428/839.6, 847, 847.1, 847.2, 847.3, 847.4, 428/847.6, 847.7, 847.8, 482, 849, 514, 515, 428/516, 517, 518, 519, 520, 521, 522, 523, 428/524, 847.5, 480, 15, 525; 528/209, 176, 528/190, 193, 194, 271, 272, 196; 525/177; 524/493, 604; 264/173.11, 210.7; 360/134
See application file for complete search history.

(56) References Cited

U.S. PATENT DOCUMENTS 4,581,438 A * 4/1986 Inata et al. .................... 528/209

(Continued)

FOREIGN PATENT DOCUMENTS

EP 2 045 281 A1 4/2009

(Continued)

OTHER PUBLICATIONS

Notification of Transmittal of Translation of the International Preliminary Report on Patentability (Form PCT/IB/338) of International Application No. PCT/JP2009/058234 mailed Dec. 29, 2010 with Forms PCT/IB/373 and PCT/ISA/237.

(Continued)

*Primary Examiner* — Kevin M. Bernatz
*Assistant Examiner* — Louis Falasco
(74) *Attorney, Agent, or Firm* — Westerman, Hattori, Daniels & Adrian, LLP

(57) ABSTRACT

A biaxially oriented laminated polyester film which has dimensional stability against environmental changes such as temperature and humidity variations and rarely elongates when a load is applied thereto at a high temperature.

The biaxially oriented laminated film comprises a film layer (A) made of an aromatic polyester (A) and a film layer (B) made of an aromatic polyester (B), wherein the content of a 6,6'-(alkylenedioxy)di-2-naphthoic acid component represented by the following formula (I) based on the total of all the acid components is less than 5 mol % in the aromatic polyester (A) and not less than 5 mol % and less than 80 mol % in the aromatic polyester (B); and the peak temperature of tan δ on a high temperature side is 135° C. or higher when viscoelasticity is measured in the machine direction.

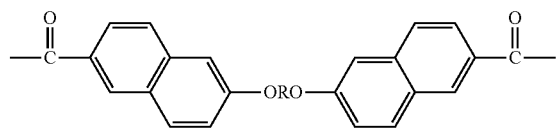

(in the formula (I), R is an alkylene group having 1 to 10 carbon atoms.)

17 Claims, 1 Drawing Sheet

U.S. PATENT DOCUMENTS

| | | |
|---|---|---|
| 6,420,011 B1 | 7/2002 | Tsunekawa et al. |
| 6,890,471 B2 | 5/2005 | Kobayashi et al. |
| 7,001,557 B2 | 2/2006 | Tsunekawa et al. |
| 2001/0044037 A1* | 11/2001 | Naoe et al. ................ 428/849 |
| 2002/0045068 A1* | 4/2002 | Tojo et al. ................ 428/847.3 |
| 2002/0167111 A1* | 11/2002 | Tsunekawa et al. ....... 264/210.7 |
| 2003/0108775 A1 | 6/2003 | Kobayashi et al. |
| 2003/0141625 A1* | 7/2003 | Shelby et al. ............ 264/173.11 |
| 2004/0013892 A1* | 1/2004 | Yano et al. ................ 428/482 |
| 2004/0191528 A1* | 9/2004 | Ishikawa et al. ........... 428/423.1 |
| 2004/0219393 A1* | 11/2004 | Ohno et al. ................ 428/849 |
| 2005/0020803 A1* | 1/2005 | Machida et al. ............ 528/196 |
| 2010/0016539 A1* | 1/2010 | Kohno et al. ............... 528/209 |
| 2010/0120967 A1 | 5/2010 | Kinoshita et al. |
| 2010/0190037 A1 | 7/2010 | Kinoshita et al. |

FOREIGN PATENT DOCUMENTS

| | | | |
|---|---|---|---|
| JP | 60-135428 A | | 7/1985 |
| JP | 60-221420 | * | 11/1985 |
| JP | 60-221420 A | | 11/1985 |
| JP | 61-145323 | * | 7/1986 |
| JP | 61-145724 | * | 7/1986 |
| JP | 61-145724 A | | 7/1986 |
| JP | 06-145323 A | | 5/1994 |
| JP | 11-001568 A | | 1/1999 |
| JP | 2000-141475 A | | 5/2000 |
| JP | 2000-355631 A | | 12/2000 |
| JP | 2007-268709 A | | 10/2007 |
| WO | 02/47889 A1 | | 6/2002 |
| WO | 2008/010607 A1 | | 1/2008 |
| WO | 2008-096612 A1 | | 8/2008 |
| WO | 2008096612 | * | 8/2008 |
| WO | 2008/153188 A1 | | 12/2008 |

OTHER PUBLICATIONS

International Search Report of PCT/JP2009/058234, mailing date Jun. 30, 2009.

* cited by examiner

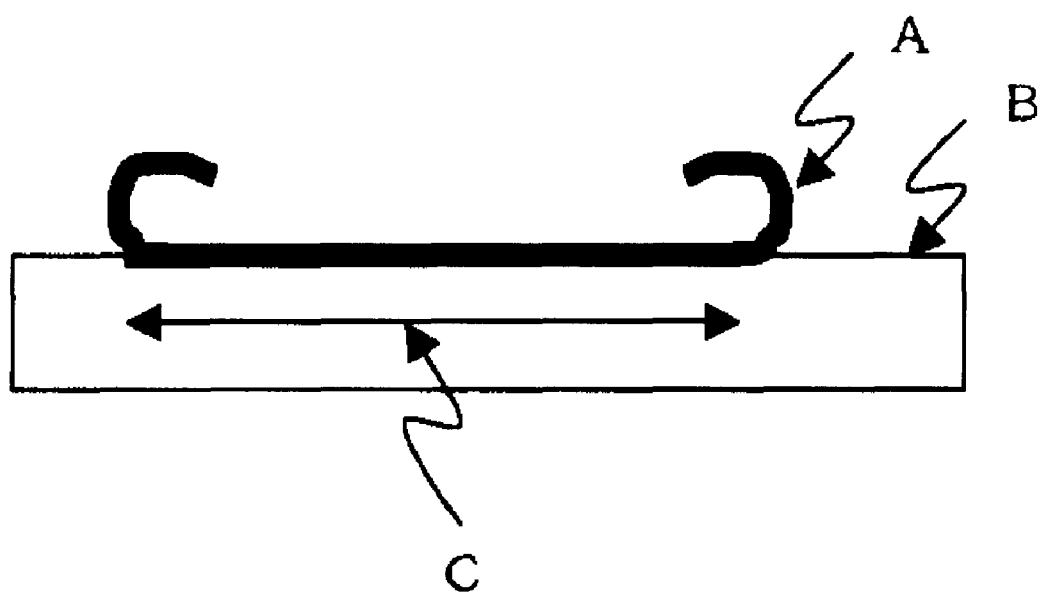

BIAXIALLY ORIENTED LAMINATED FILM

TECHNICAL FIELD

The present invention relates to a biaxially oriented laminated film comprising an aromatic polyester containing 6,6'-(alkylenedioxy)di-2-naphthoic acid.

BACKGROUND ART

Aromatic polyesters typified by polyethylene terephthalate and polyethylene-2,6-naphthalate (polyethylene-2,6-naphthalene dicarboxylate) are widely used in films because they have excellent mechanical properties, dimensional stability and heat resistance. Especially polyethylene-2,6-naphthalate has more excellent mechanical properties, dimensional stability and heat resistance than polyethylene terephthalate and is therefore used in fields in which these requirements are very high, for example, base films for high-density magnetic recording media. However, the requirement for dimensional stability in the high-density magnetic recording media is becoming higher and higher, and the further improvement of this property is desired.

Patent Documents 1 to 5 propose a polyalkylene-6,6'-(alkylenedioxy)di-2-naphthoate obtained from diethyl-6,6'-(alkylenedioxy)di-2-naphthoate which is an ester compound of 6,6'-(alkylenedioxy)di-2-naphthoic acid.

Especially Patent Document 3 teaches that a magnetic recording flexible disk having a small tracking shift is obtained from a film of polyethylene-6,6'-(ethylenedioxy)di-2-naphthoate by setting its maximum temperature expansion coefficient to 10 to 35 (ppm/° C.), its maximum humidity expansion coefficient to 0 to 8 (ppm/% RH), the difference between the maximum and minimum temperature expansion coefficients to 0 to 6.0 (ppm/° C.) and the difference between the maximum and minimum humidity expansion coefficients to 0 to 4.0 (ppm/% RH).

However, the requirement for the improvement of recording density in magnetic recording media is now very high and accordingly, dimensional stability required for the base film cannot be attained not only by polyethylene terephthalate but also by polyethylene-2,6-naphthalate and the film proposed by Patent Document 3 any longer.
(Patent Document 1) JP-A 60-135428
(Patent Document 2) JP-A 60-221420
(Patent Document 3) JP-A 61-145724
(Patent Document 4) JP-A 6-145323
(Patent Document 5) WO2008/010607
(Patent Document 6) WO2008/096612

DISCLOSURE OF THE INVENTION

In a biaxially oriented polyester film, the humidity expansion coefficient ($\alpha$h) and the temperature expansion coefficient ($\alpha$t) have very close relationship with the Young's modulus. In general, as the Young's modulus becomes higher, they become lower. However, the Young's modulus cannot be increased infinitely and has its limits from the viewpoint of securing film forming properties and a Young's modulus in the orthogonal direction. Therefore, even when the Young's modulus is almost the same, a film having a low temperature expansion coefficient and a low humidity expansion coefficient is desired. Since a film made of the above polyalkylene-6,6'-(alkylenedioxy)di-2-naphthoate has a low humidity expansion coefficient ($\alpha$h) though its Young's modulus is low, it is considered as a preferred film.

However, looking at the above Patent Documents 1 to 5, a film made of a polyalkylene-6,6'-(alkylenedioxy)di-2-naphthoate has a problem that its Young's modulus in one direction can be made very high but the Young's modulus in the direction orthogonal to the above direction becomes very low. It has another problem that its humidity expansion coefficient ($\alpha$h) is very low but its temperature expansion coefficient ($\alpha$t) is high.

In the case of the film disclosed in Example 1 of Patent Document 3, its temperature expansion coefficient ($\alpha$t) is very high at 16.5 to 19 ppm/° C. at maximum.

The inventors of the present invention found that a film made of an aromatic polyester comprising a 6,6'-(alkylenedioxy)di-2-naphthoic acid component and another aromatic dicarboxylic acid component has the excellent characteristic properties of these components and filed an international application for this invention. This application was laid open internationally after the priority date of the present application (Patent Document 6). This film has excellent dimensional stability against temperature and humidity changes when it is used in a magnetic recording medium. However, when they conducted further studies on the film, they found that the film tends to elongate in a direction in which tension is applied thereto during processing at a temperature of about 120° C. at which a problem does not occur in a polyethylene-2,6-naphthalene dicarboxylate film though it is excellent in dimensional stability against temperature and humidity changes. As a result, the film is apt to crease after processing. They also found that when the film is laminated with a film layer made of another aromatic polyester to suppress the elongation of the film during processing at a high temperature, there is underlying a new problem that the laminated film readily curls.

It is therefore an object of the present invention to provide a film which has excellent dimensional stability against humidity changes and rarely elongates when a load is applied thereto at a high temperature. It is another object of the present invention to provide a film which has excellent dimensional stability against environmental changes such as temperature and humidity variations and rarely elongates when a load is applied thereto at a high temperature. It is still another object of the present invention to provide a film which is suppressed from curling. It is a further object of the present invention to provide a film which can have good surface properties and windability at the same time.

The inventors of the present invention conducted intensive studies on a film which rarely elongates at a high temperature while retaining the characteristic properties of a film containing 6,6'-(alkylenedioxy)di-2-naphthoic acid. As a result, they found that when a film layer (B) made of a polyester comprising a 6,6'-(alkylenedioxy)di-2-naphthoic acid component and an aromatic dicarboxylic acid component and a film layer (A) comprising another aromatic dicarboxylic acid component as the main component are laminated together, a laminated film which has excellent dimensional stability against environmental changes such as temperature and humidity variations and rarely elongates when a load is applied thereto at a high temperature is obtained. The present invention was accomplished based on this finding.

The inventors further found that when film layers (B) and film layers (A) are laminated together alternately, a laminated film which has excellent dimensional stability against temperature and humidity changes, rarely elongates when a load is applied thereto at a high temperature and is suppressed from curling is obtained.

The inventors also found that when the film layers (B) and the film layers (A) are laminated together alternately and the front side and the rear side of the film are made different from each other in surface roughness, a film which can be suppressed from elongation during processing while having a low humidity expansion coefficient (αh) and also has excellent surface properties and windability and a surface preferred for high-density recording can be obtained at a low cost. They further found that the elongation and creasing of the film caused by processing in which tension is applied thereto at a high temperature, such as a drying step after a magnetic layer is formed by coating, can be suppressed by means for providing a specific heat absorption peak, which is used in a photographic film as a technique for suppressing the curling of a film.

That is, the present invention includes the following inventions.

1. A biaxially oriented laminated film comprising a film layer (A) made of an aromatic polyester (A) and a film layer (B) made of an aromatic polyester (B), wherein the content of a 6,6'-(alkylenedioxy)di-2-naphthoic acid component represented by the following formula (I) based on the total of all the acid components is less than 5 mol % in the aromatic polyester (A) and not less than 5 mol % and less than 80 mol % in the aromatic polyester (B); and the peak temperature of tan δ on a high temperature side is 135° C. or higher when viscoelasticity is measured in the machine direction.

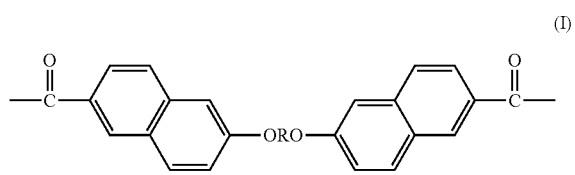

(I)

(in the formula (I), R is an alkylene group having 1 to 10 carbon atoms.)

2. The laminated film in the above paragraph 1, wherein the dicarboxylic acid components of the aromatic polyester (B) include not less than 5 mol % and less than 80 mol % of the acid component represented by the formula (I) and more than 20 mol % and not more than 95 mol % of a 2,6-naphthalenedicarboxylic acid component.

3. The laminated film in the above paragraph 1, wherein the dicarboxylic acid components of the aromatic polyester (A) include less than 5 mol % of the acid component represented by the formula (I) and more than 95 mol % of a 2,6-naphthalenedicarboxylic acid component.

4. The laminated film in the above paragraph 1, wherein R in the formula (I) is an ethylene group.

5. The laminated film in the above paragraph 1, wherein the aromatic polyesters (A) and (B) comprise an ethylene glycol component in an amount of 90 to 100 mol % based on the total of all the glycol components.

6. The laminated film in the above paragraph 1, wherein the thickness of the film layer (B) is 50 to 95% of the total thickness of the laminated film.

7. The laminated film in the above paragraph 1, wherein the film layer (A) is formed on one side of the film layer (B).

8. The laminated film in the above paragraph 1, wherein the film layer (A) is formed on both sides of the film layer (B).

9. The laminated film in the above paragraph 1 which has 11 or more alternating film layers (A) and film layers (B).

10. The laminated film in the above paragraph 9, wherein the laminated film has a first surface layer, inner layers and a second surface layer, each composed of the film layer (A) or the film layer (B), the surface roughness (RaX) of the first surface layer is 0.5 to 5 nm, and the surface roughness (RaY) of the second surface layer is 1 nm or more larger than Rax and not more than 10 nm.

11. The laminated film in the above paragraph 10, wherein one of the film layer (A) and the film layer (B) forms both of the first surface layer and the second surface layer, (i) the inner layers contain 0.001 to 5 wt % of inert particles having an average particle diameter of 0.01 to 1.0 μm, (ii) the first surface layer and the second surface layer do not contain inert particles, contain particles having a smaller average particle diameter than that of the inner layers, or contain a smaller amount of inert particles having the same average particle diameter than in the inner layers, and (iii) the thickness (tX) of the first surface layer is 1.5 times or more larger than the thickness (tY) of the second surface layer.

12. The laminated film in the above paragraph 10, wherein one of the film layer (A) and the film layer (B) forms the second surface layer and the other forms the first surface layer, (i) the second surface layer contains 0.001 to 5 wt % of inert particles having an average particle diameter of 0.01 to 1.0 μm, and (ii) the first surface layer does not contain inert particles, contains inert particles having a smaller average particle diameter than that of the second surface layer, or contains a smaller amount of inert particles having the same average particle diameter than in the second surface layer.

13. The laminated film in the above paragraph 12, wherein the thickness (tX (nm)) of the first surface layer, the thickness (tY (nm)) of the second surface layer, the thickness (tX' (nm)) of a film layer adjacent to the first surface layer and the thickness (tY' (nm)) of a film layer adjacent to the second surface layer satisfy at least one of the following relational expressions.

$$tX>1.5\times tX'$$ (expression 1)

$$tY>1.5\times tY'$$ (expression 2)

14. The laminated film in any one of the above paragraphs 10 to 13, wherein the laminated film has a third surface layer (layer C) containing 0.001 to 5 wt % of inert particles having an average particle diameter of 0.01 to 1.0 μm on the second surface layer or in place of the second surface layer, and the first surface layer and the inner layers do not contain inert particles, contain particles having a smaller average particle diameter than that of the layer C, or contain a smaller amount of inert particles having the same average particle diameter than in the layer C.

15. The laminated film in any one of the above paragraphs 10 to 14 which has a fourth surface layer (layer D) containing inert particles and formed of a coating film on the first surface layer and/or the second surface layer.

16. The laminated film in the above paragraph 14 or 15, wherein the inner layers do not contain inert particles.

17. The laminated film in any one of the above paragraphs 10 to 16 which has a thickness of 1 to 10 μm.

18. The laminated film in the above paragraph 1 which is used as a base film for magnetic recording media.

BRIEF DESCRIPTION OF THE DRAWING

FIG. 1 is a diagram of the measurement of curling in Examples.

EXPLANATIONS OF LETTERS

| A | film |
| B | table |
| C | uncurled portion |

BEST MODE FOR CARRYING OUT THE INVENTION

The present invention is a biaxially oriented laminated film comprising a film layer (A) made of an aromatic polyester (A) and a film layer (B) made of an aromatic polyester (B). A description is given of the aromatic polyester (B), the aromatic polyester (A) and the biaxially oriented laminated film sequentially.

<Aromatic Polyester (B)>

The aromatic polyester (B) comprises a 6,6'-(alkylenedioxy)di-2-naphthoic acid component represented by the following formula (I) in an amount of not less than 5 mol % and less than 80 mol % based on the total of all the acid components. When the content of the component represented by the formula (I) is lower than the lower limit, the effect of reducing the humidity expansion coefficient (αh) is hardly obtained. The upper limit is less than 80 mol % from the viewpoint of moldability. The effect of reducing the humidity expansion coefficient (αh) by the component represented by the formula (I) is obtained very efficiently with a small amount of the above component and becomes almost saturated when the content of the above component is less than 50 mol %. Therefore, the content is preferably less than 50 mol %.

From this point of view, the upper limit of the content of the component represented by the formula (I) is preferably 45 mol %, more preferably 40 mol %, much more preferably 35 mol %, particularly preferably 30 mol %. On the other hand, the lower limit is preferably 5 mol %, more preferably 7 mol %, much more preferably 10 mol %, particularly preferably 15 mol %.

By using an aromatic polyester comprising a specific amount of the component represented by the formula (I) in at least one film layer, a film having a low temperature expansion coefficient (αt) and a low humidity expansion coefficient (αh) can be produced.

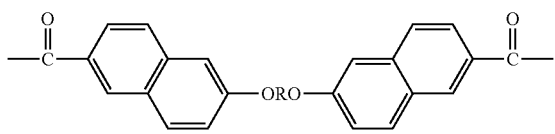

(I)

In the formula (I), R is an alkylene group having 1 to 10 carbon atoms. Examples of the alkylene group having 1 to 10 carbon atoms include ethylene group, trimethylene group and butylenes group. Examples of the component represented by the formula (I) include a 6,6'-(ethylenedioxy)di-2-naphthoic acid component, 6,6'-(trimethylenedioxy)di-2-naphthoic acid component and 6,6'-(butylenedioxy)di-2-naphthoic acid component. Out of these, components of the formula (I) in which the number of carbon atoms of R is even are preferred, and the 6,6'-(ethylenedioxy)di-2-naphthoic acid component is particularly preferred from the viewpoint of the effect of the present invention.

Examples of another dicarboxylic acid component except for the component represented by the formula (I) include a terephthalic acid component, isophthalic acid component, 2,6-naphthalenedicarboxylic acid component and 2,7-naphthalenedicarboxylic acid component. The terephthalic acid component and the 2,6-naphthalenedicarboxylic acid component are preferred, and the 2,6-naphthalenedicarboxylic acid component is particularly preferred from the viewpoint of the mechanical properties of the obtained film.

Therefore, it is preferred that the dicarboxylic acid components of the aromatic polyester (B) should include not less than 5 mol % and less than 80 mol % of the acid component represented by the formula (I) and more than 20 mol % and not more than 95 mol % of the 2,6-naphthalenedicarboxylic acid component.

Glycol components include an ethylene glycol component, trimethylene glycol component, tetramethylene glycol component and cyclohexanedimethanol component. The ethylene glycol component is preferred from the viewpoint of the mechanical properties of the obtained film. The aromatic polyester (B) comprises the ethylene glycol component in an amount of preferably 90 to 100 mol %, more preferably 95 to 100 mol % based on the total of all the glycol components.

The aromatic polyester (B) may comprise another comonomer known per se as long as the effect of the present invention is not impaired.

The intrinsic viscosity of the aromatic polyester (B) measured at 35° C. in a mixed solvent of p-chlorophenol and 1,1,2,2-tetrachloroethane (weight ratio of 40/60) is preferably 0.4 to 1.5 dl/g, more preferably 0.5 to 1.3 dl/g.

Since the melt viscosity of the aromatic polyester (B) tends to become high, its melting point measured by DSC is in the range of preferably 200 to 260° C., more preferably 210 to 255° C., particularly preferably 220 to 253° C. from the viewpoint of film forming properties. When the melting point is higher than the above upper limit, the melt viscosity becomes high, thereby reducing flowability and making delivery nonuniform at the time of melt extrusion molding with the result of the deterioration of film forming properties. When the melting point is lower than the above lower limit, although film forming properties are excellent, the mechanical properties of an aromatic polyester comprising a 6,6'-(alkylenedioxy)di-2-naphthoic acid component are apt to be impaired. Although mechanical properties generally deteriorate when the melting point is reduced by copolymerizing another acid component, surprisingly, the same mechanical properties as those of an aromatic polyester to be copolymerized or a polymer comprising an ester of 6,6'-(alkylenedioxy)di-2-naphthoic acid as the main recurring unit described in Patent Documents 1 to 5 can be obtained maybe because of improved film forming properties.

The glass transition temperature (may be referred to as Tg hereinafter) of the aromatic polyester (B) measured by DSC is preferably 90 to 120° C., more preferably 95 to 119° C., much more preferably 100 to 118° C. Tg within this range is preferred from the viewpoints of heat resistance and dimensional stability. The melting point and the glass transition temperature can be adjusted by controlling the type and amount of a comonomer and a dialkylene glycol as a by-product.

<Aromatic Polyester (A)>

The aromatic polyester (A) constitutes the film layer (A) for suppressing the elongation of the film layer (B) which occurs during processing at a high temperature. The film layer (A) must have a tan δ of 135° C. or higher in the measurement of viscoelasticity in the machine direction when it is laminated with the film layer (B) to obtain a biaxially oriented laminated film. Therefore, the content of the component represented by the formula (I) must be not more than 5 mol % based on the total molar amount of all the acid components.

The aromatic polyester (A) comprises an ethylene glycol component in an amount of preferably 90 to 100 mol %, more preferably 95 to 100 mol % based on the total of all the glycol components.

The intrinsic viscosity of the aromatic polyester (A) measured at 35° C. in a mixed solvent of p-chlorophenol and 1,1,2,2-tetrachloroethane (weight ratio of 40/60) is preferably 0.45 to 1.5 dl/g, more preferably 0.5 to 1.0 dl/g, particularly preferably 0.55 to 0.8 dl/g.

The aromatic polyester (A) preferably has a Tg (glass transition temperature) in DSC of 110° C. or higher as a polyester resin composition constituting the film layer (A) because the above tan δ is easily obtained. The lower limit of the glass transition temperature of the aromatic polyester (A) is preferably 110° C., more preferably 115° C. The upper limit is not particularly limited but preferably 170° C., more preferably 150° C. from the viewpoint of film forming properties when the layer is laminated with the film layer (B).

From this point of view, it is preferred that the dicarboxylic acid components of the aromatic polyester (A) should include less than 5 mol % of the acid component represented by the formula (I) and more than 95 mol % of the 2,6-naphthalenedicarboxylic acid component.

The aromatic polyester (A) is preferably polyethylene-2,6-naphthalene dicarboxylate which comprises not less than 95 mol % of ethylene-2,6-naphthalene dicarboxylate based on the total of all the recurring units. It may be a copolymer comprising a component which can further increase Tg, or a blend.

The aromatic polyester (A) may be polyethylene terephthalate which comprises ethylene terephthalate as the main recurring unit. In the case of polyethylene terephthalate, preferably, a comonomer which can increase the glass transition temperature is copolymerized, or polyether imide or a liquid crystal resin is blended (refer, for example, to JP-A 2000-355631, JP-A 2000-141475 and JP-A 11-1568).

The melting point measured by DSC of the aromatic polyester (A) is preferably 240 to 300° C., more preferably 250 to 290° C., much more preferably 260 to 280° C. from the viewpoint of film forming properties. When the melting point is higher than the above upper limit, the melt viscosity becomes high, thereby reducing flowability and making delivery nonuniform at the time of melt extrusion molding with the result of the deterioration of film forming properties. When the melting point is lower than the above lower limit, although film forming properties are excellent, the effect of suppressing elongation during processing is apt to become unsatisfactory.

<Biaxially Oriented Laminated Film>

The biaxially oriented laminated film of the present invention comprise the film layers (A) and the film layers (B). The biaxially oriented laminated film of the present invention includes (1) a laminated film consisting of 10 or less layers, (2) a laminated film consisting of 11 or more layers and (3) a laminated film.

The peak temperature of tan δ on a high temperature side in the machine direction is 135° C. or higher in the measurement of the viscoelasticity of the biaxially oriented laminated film of the present invention. When the peak temperature is lower than the lower limit, the effect of suppressing elongation during processing at a high temperature becomes unsatisfactory. The above peak temperature is preferably 140 to 200° C., more preferably 145 to 180° C. The peak temperature of tan δ on the high temperature side is required to suppress the elongation of the film layer (B) comprising a large amount of the component represented by the formula (I) during processing at a high temperature and is developed by the film layer (A). As for the peak temperature of tan δ, in general, a peak derived from the film layer (A) appears on a high temperature side and a peak derived from the film layer (B) appears on a low temperature side. Elongation during processing at a high temperature can be suppressed by the existence of the peak temperature on the high temperature side. To enable the film layer (A) to develop such a high peak temperature of tan δ on the high temperature side, the above polyester (A) must be selected and molecular orientation in the machine direction must be enhanced by stretching.

The thickness of the biaxially oriented laminated film of the present invention should be suitably determined according to application purpose. When the laminated film is used as a base film for magnetic recording tapes, its thickness is preferably 1 to 10 μm, more preferably 3 to 7 μm, particularly preferably 4 to 6 μm.

In the biaxially oriented laminated film of the present invention, the film layer (B) is preferably made thick to improve dimensional stability against environmental changes. From this point of view, the lower limit of the total thickness of the film layers (B) is preferably 10%, more preferably 20%, much more preferably 30%, further preferably 50%, particularly preferably 55%, most preferably 60% of the total thickness of the biaxially oriented laminated film. The upper limit is preferably 95%, more preferably 90%, much more preferably 85%, particularly preferably 80% of the total thickness. Within this range, the effect of improving dimensional stability against humidity changes and the effect of suppressing elongation during processing can be obtained efficiently. Below the lower limit, the effect of reducing the humidity expansion coefficient (αh) is apt to become unsatisfactory and above the upper limit, the effect of suppressing elongation during processing by the film layer (A) is apt to become unsatisfactory.

When the biaxially oriented laminated film of the present invention is used as a base film for magnetic tapes, it preferably has a high Young's modulus of not less than 6.0 GPa in at least one of the planar directions of the film so that the base film does not elongate. In addition, such a high Young's modulus can reduce the humidity expansion coefficient (αh). The upper limit of the Young's modulus is not limited but generally 11 GPa. The Young's modulus in the longitudinal direction of the film is preferably 4 to 11 GPa, more preferably 5 to 10 GPa, particularly preferably 5.5 to 9 GPa. The Young's modulus in the transverse direction of the film is preferably 5 to 11 GPa, more preferably 6 to 11 GPa, much more preferably 7 to 10 GPa, particularly preferably 8 to 10 GPa.

Preferably, the biaxially oriented laminated film of the present invention has a temperature expansion coefficient (αt) in at least one direction, preferably the transverse direction of the film of not more than 10 ppm/° C. to obtain excellent dimensional stability. When the temperature expansion coefficient (αt) in at least one direction of the film is not more than 10 ppm/° C., excellent dimensional stability against environmental changes can be obtained. Although it is expected from the results of Patent Document 3 that the temperature expansion coefficient (αt) becomes high when polyalkylene-6,6'-(alkylenedioxy)di-2-naphthoate is copolymerized, surprisingly, the temperature expansion coefficient (αt) can be made low by copolymerizing a specific amount of the above substance and stretching the obtained copolymer. The lower limit of the temperature expansion coefficient (αt) is not limited but generally −15 ppm/° C. The temperature expansion coefficient (αt) is preferably −10 to 10 ppm/° C., more preferably −7 to 7 ppm/° C., much more preferably −6 to 6 ppm/° C., particularly preferably −5 to 5 ppm/° C. When the temperature expansion coefficient (αt) falls within this range, the obtained magnetic recording tape can exhibit excellent dimensional stability against dimensional changes caused by ambient temperature and humidity variations.

The temperature expansion coefficient (αt) can be adjusted by setting the content of the 6,6'-(alkylenedioxy)di-2-naphthoic acid component to be contained in the aromatic polyester (B) to preferably less than 50 mol %, more preferably not more than 45 mol %, much more preferably not more than 40 mol %, particularly preferably not more than 35 mol %, most preferably not more than 30 mol %, increasing the draw ratio so as to fully orient the molecular chain in that direction, or preventing the stretching temperature from becoming too high.

The biaxially oriented laminated film of the present invention has a humidity expansion coefficient (αh) in at least one direction, preferably the transverse direction of the film of preferably 3 to 7 ppm/% RH, more preferably 3 to 6 ppm/% RH. When the humidity expansion coefficient (αh) falls within this range, the dimensional stability of a magnetic recording tape obtained from this film becomes excellent. Particularly when this film is used as a base film for a magnetic recording tape, it is preferred that the direction having a lower humidity expansion coefficient (αh) should be the transverse direction of the biaxially oriented laminated film because a tracking shift can be suppressed completely. In the present invention, the transverse direction of the film is a direction orthogonal to the machine direction (may be referred to as "longitudinal direction" or "vertical direction") of the film and may also be referred to as "crosswise direction".

As for the direction in which the temperature expansion coefficient (αt) is not more than 10 ppm/° C., at least one direction, preferably the transverse direction should satisfy the above requirement, and the direction orthogonal to the transverse direction preferably satisfies the same requirements for the temperature expansion coefficient (αt), the humidity expansion coefficient (αh) and the Young's modulus as above from the viewpoint of dimensional stability.

To increase the surface roughness of the film, inert particles are contained in a film layer to form projections. Examples of the inert particles to be contained include (1) heat-resistant polymer particles (for example, particles of crosslinked silicone resin, crosslinked polystyrene, crosslinked acrylic resin, melamine-formaldehyde resin, aromatic polyamide resin, polyimide resin, polyamide-imide resin and crosslinked polyesters), (2) particles of inorganic compounds such as metal oxides (for example, aluminum oxide, titanium dioxide, silicon dioxide (silica), magnesium oxide, zinc oxide and zirconium oxide), metal carbonates (for example, magnesium carbonate and calcium carbonate), metal sulfates (for example, calcium sulfate and barium sulfate), carbons (for example, carbon black, graphite and diamond), and clay minerals (for example, kaolin, clay and bentonite), (3) externally added particles which are added in a particulate form such as core-shell type composite particles comprising a core and a shell made of different materials, and (4) internally precipitated particles formed by the precipitation of a catalyst.

Out of these, at least one type of particles selected from the group consisting of crosslinked silicone resin, crosslinked acrylic resin, crosslinked polyester, crosslinked polystyrene, aluminum oxide, titanium dioxide, silicon dioxide, kaolin and clay are preferred. At least one type of particles selected from the group consisting of crosslinked silicone resin, crosslinked acrylic resin, crosslinked polyester, crosslinked polystyrene and silicon dioxide (excluding porous silica) are particularly preferred because variations in the particle diameter of the particles can be easily reduced. As a matter of course, two or more different types of particles may be used in combination.

The average particle diameter of the inert particles to be contained in the film layer is preferably 0.05 to 1.0 μm, more preferably 0.1 to 0.8 μm from the viewpoint of running properties. When the film is used in a magnetic recording medium, the average particle diameter of the inert particles is in the range of preferably 0.1 to 0.5 μm, more preferably 0.1 to 0.3 μm. The content of the inert particles to be contained in the film layer is preferably 0.005 to 1.0 wt %, more preferably 0.01 to 0.5 wt % based on the weight of the film layer.

As for the biaxially oriented laminated film of the present invention, the above laminated films (1), (2) and (3) are detailed hereinunder independently.

<Laminated Film (1)>

The laminated film (1) includes a double-layer film which consists of a film layer (B) and a film layer (A) formed on one side of the film layer (B). The laminated film (1) also includes a three-layer film comprising the film layer (A) on both sides of the film layer (B). The laminated film (1) may also be a laminated film consisting of 4 or more alternating film layers (A) and film layers (B). Another film layer or a coating layer may be formed on the film (1) of the present invention as long as the effect of the present invention is not impaired.

In the laminated film (1) of the present invention, the difference between one surface roughness (Ra) and the other surface roughness (RaA) is preferably not less than 1 nm, more preferably not less than 2 nm, much more preferably not less than 3 nm in order to obtain excellent running properties and flatness at the same time. When the difference in surface roughness is set to the lower limit or more, excellent flatness and windability can be provided to the film as compared with a single-layer film. The upper limit of the difference in surface roughness is not particularly limited but preferably 8 nm, more preferably 5 nm, much more preferably 4 nm to prevent the flat surface from being marred by the transfer of the rough surface or tossing from the rough surface. The surface roughness (Ra) of the flat surface is preferably 1.0 to 7.0 nm, more preferably 1.5 to 5.0 nm, much more preferably 2.0 to 4.0 nm. To provide excellent windability to the laminated film (1), the surface roughness (Ra) of the rough traveling surface is preferably 5 to 15 nm, more preferably 6 to 10 nm, much more preferably 6 to 8 nm.

To set the above difference in surface roughness, a method known per se may be employed. For example, larger particles should be contained in a film layer for forming the rough surface than those contained in a film layer for forming the other surface layer, a larger amount of particles should be contained in the film layer for forming the other surface layer, and further a coating layer should be formed.

<Laminated Film (2)>

The laminated film (2) of the present invention has 11 or more alternating film layers (A) and film layers (B). The preferred total number of layers is preferably 31 to 10,001, more preferably 51 to 1,001 as the total number of the film layers (A) and the film layers (B) in order to obtain the uniformity of layer configuration and an effect. When the total number of layers is 11 or more, curling can be easily suppressed. The upper limit of the number of layers is not particularly limited but preferably 10,001 because the laminate structure can be easily maintained. The thickness of each film layer (A) is preferably 0.1 to 1,000 nm, more preferably 1 to 100 nm to obtain the uniformity of layer configuration and an effect.

The surface roughness (Ra) on one side of the laminated film (2) is preferably 1 to 20 nm, more preferably 2 to 10 nm.

In the present invention, as mentioned in the beginning, the component represented by the above formula (I) is contained at least in the aromatic polyester (B) to reduce the humidity expansion coefficient ($\alpha$h) relative to the Young's modulus. Further, since 11 or more film layers (A) and film layers (B) are laminated together alternately, when the Young's modulus remains the same, a lower humidity expansion coefficient ($\alpha$h) can be obtained from the resulting laminated film than that of a single-layer film made of an aromatic polyester having the same content of the 6,6'-(alkylenedioxy)di-2-naphthoic acid component. From this point of view, the effect of reducing the humidity expansion coefficient ($\alpha$h) which is not expected from an organic bond can be obtained by containing the component represented by the above formula (I) in the aromatic polyester (B) and laminating together 11 or more alternating film layers (A) and film layers (B).

<Laminated Film (3)>

The present invention includes the laminated film (3) having 11 or more alternating film layers (A) and film layers (B), wherein a first surface layer, inner layers and a second surface layer are composed of the film layers (A) and the film layers (B), the surface roughness (RaX) of the first surface layer is 0.5 to 5 nm, and the surface roughness (RaY) of the second surface layer is 1 nm or more larger than RaX and not more than 10 nm. The first surface layer has a smaller surface roughness than the second surface layer.

When RaX is not less than 0.5 nm, slipperiness and windability improve. When RaX is not more than 5 nm, the electromagnetic conversion characteristics of a magnetic tape obtained from the laminated film become excellent. RaX is more preferably 1 to 4 nm, much more preferably 1.5 to 3 nm. When RaY is 1 nm or more larger than RaX, the surface becomes suitably rough and windability improves. When RaY is not more than 10 nm, there is no possibility of the transfer of the surface to the surface of the magnetic layer of a magnetic tape, and the electromagnetic conversion characteristics and the error rate rarely deteriorate. RaY is preferably 2 to 9 nm, more preferably 3 to 8 nm, much more preferably 4 to 7 nm.

It is difficult only for the film layers (A) and the film layers (B) forming a laminate structure to achieve the above surface roughnesses simply by containing inert particles in one of the film layers. Then, the preferred layer configuration of the film will be further detailed hereinunder.

There is a laminated film having an odd total number of the film layers (A) and the film layers (B) as the laminated film (3) of the present invention.

That is, preferably, either one of the film layer (A) and the film layer (B) forms both the first surface layer and the second surface layer, (i) the inner layers contain 0.001 to 5 wt % of inert particles having an average particle diameter of 0.01 to 1.0 µm, (ii) the first surface layer and the second surface layer do not contain inert particles, contain inert particles having a smaller average particle diameter than that of the inner layers, or contain a smaller amount of inert particles having the same average particle diameter than in the inner layers, and (iii) the thickness (tX) of the first surface layer is 1.5 times or more larger than the thickness (tY) of the second surface layer.

The influence of the inert particles existent in the inner film layers can be suppressed and the first surface layer having a small surface roughness can be made more flat by setting tX to 1.5 times or more larger than tY.

There is also a laminated film having an even total number of the film layers (A) and the film layers (B) as the laminated film (3) of the present invention.

That is, preferably, one of the film layer (A) and the film layer (B) forms the second surface layer and the other film layer forms the first surface layer, (i) the second surface layer contains 0.001 to 5 wt % of inert particles having an average particle diameter of 0.01 to 1.0 µm, and (ii) the first surface layer does not contain inert particles, contains inert particles having a smaller average particle diameter than that of the second surface layer, or contains a smaller amount of inert particles having the same average particle diameter than in the second surface layer.

The thickness (tX (nm)) of the first surface layer, the thickness (tY (nm)) of the second surface layer, the thickness (tX' (nm)) of a film layer adjacent to the first surface layer and the thickness (tY' (nm)) of a film layer adjacent to the second surface layer preferably satisfy at least one of the following relational expressions.

$$tX > 1.5 \times tX' \quad \text{(expression 1)}$$

$$tY > 1.5 \times tY' \quad \text{(expression 2)}$$

The thickness ratio in the expressions 1 and 2 is more preferably 2 times or more, more preferably 5 times or more, particularly preferably 10 times or more. The upper limit is not particularly limited but generally 500 times or less, more preferably 300 times or less. When tX and tX' satisfy the above expression 1, the surface roughness is easily made small and when tY and tY' satisfy the above expression 2, the surface roughness is easily made large.

Either one of the film layer (A) and the film layer (B) may be used as the first surface layer having a smaller surface roughness or the second surface layer having a larger surface roughness. The above-described substances can be advantageously used as the inert particles to be contained in these layers, and the inert particles to be contained in the second surface layer are preferably organic particles, particularly preferably crosslinked polystyrene organic particles or silicone resin particles from the viewpoint of the suppression of transfer to the back surface in the curing step for obtaining a magnetic recording medium. On the other hand, as the inert particles to be contained in the first surface layer, inert particles having a small particle diameter and uniform in size are preferably dispersed uniformly without being agglomerated. From this point of view, globular inert particles are preferred, and spherical silica particles are particularly preferred.

The laminated film (3) of the present invention has 11 or more alternating film layers (A) and film layers (B), all of which form the first surface layer, the inner layers and the second surface layer. The laminated film (3) may have a third surface layer different from the first surface layer and the second surface layer. Particularly when the film layers must be made thin, there is a case where it is difficult to form surface layers having both slipperiness and surface flatness only with a laminate structure consisting of the film layers (A) and the film layers (B). In this case, the third surface layer is formed on the second surface layer or in place of the second surface layer to obtain both slipperiness and surface flatness.

That is, preferably, the laminated film preferably has the third surface layer (layer C) containing 0.001 to 5 wt % of inert particles having an average particle diameter of 0.01 to 1.0 µm on the second surface layer or in place of the second surface layer, and the first surface layer and the inner layers do not contain inert particles, contain particles having a smaller average particle diameter than that of the layer C, or contain a smaller amount of inert particles having the same average particle diameter than in the layer C.

The third surface layer preferably contains 0.001 to 5 wt % of inert particles having an average particle diameter of 0.01 to 1.0 μm. Preferably, the inert particles to be contained in the third surface layer differ from the inert particles to be contained in the first surface layer and the inner layers in type, size and amount in order to provide a difference in surface roughness. Meanwhile, the composition of a polymer constituting the third surface layer is not particularly limited, and a thermoplastic resin known per se except for polyesters may be used. It is preferably the same aromatic polyester as those of the film layer (A) and the film layer (B). When the third surface layer is made thick, the composition of the polymer constituting the third surface layer is preferably intermediate between those of the aromatic polyester of the film layer (A) and the aromatic polyester of the film layer (B) because curling can be suppressed more completely.

The surface on which the third surface layer is to be formed is either one of the surface of the film layer (A) and the surface of the film layer (B). Besides the above combination, the third surface layer may be formed on the first surface layer. The inert particles to be contained in the third surface layer are preferably organic particles or a combination of organic particles and inorganic particles, crosslinked polystyrene and silicone resin particles are preferred as the organic particles, and spherical silica and titanium oxide particles are preferred as the inorganic particles.

The laminated film (3) of the present invention may have a fourth surface layer (layer D) containing inert particles and formed of a coating film on the first surface layer and/or the second surface layer.

When the laminated film (3) has the fourth surface layer, the surface roughness should be satisfied while the surface of the fourth surface layer is measured. The fourth surface layer can be obtained by coating an unstretched or monoaxially stretched film before the completion of stretching with a water-soluble resin during film formation, hot melt coating a film after the completion of film formation, or applying a resin dissolved in a solvent to a film after the completion of film formation and drying it. The surface on which the fourth surface layer is to be formed is the surface of the first surface layer, the second surface layer or both, or the third surface layer and may be one side or both sides. When the surface on which the fourth surface layer is to be formed is a flat surface with a small surface roughness, the coating layer preferably contains inert particles having a small average particle diameter of 1 to 40 nm. The average particle diameter of the inert particles is preferably 2 to 30 nm, more preferably 5 to 25 nm. When the surface on which the fourth surface layer is to be formed is a rough surface with a large surface roughness, the fourth surface layer preferably contains particles having an average particle diameter of 30 to 100 nm. The average particle diameter of the inert particles is preferably 35 to 80 nm, more preferably 35 to 60 nm. As for the type of the particles, spherical organic particles such as crosslinked polystyrene and silicone resin particles are preferred. When a rough surface is to be coated, if a hard resin such as methyl cellulose is contained, the blocking of a rolled film can be suppressed advantageously. In the present invention, when the coating layer is formed, the above tX and tY mean the thicknesses of the first surface layer and the second surface layer located on the inner side of the fourth surface layer.

As for the thickness of the alternately laminated portion of the laminated film (3) of the present invention, the thickness of the surface layers and the thickness of the other portion are preferably made different from each other as described above.

As for changes in thickness, only the surface layers may be made thick or the thickness of the alternately laminated portion may be changed continuously in the thickness direction.

The average thickness of the inner layers except for the surface layers forming the laminate structure of the laminated film (3) (average thickness of the film layers (A): tA (nm), average thickness of the film layers (B): tB (nm)) is not particularly limited but preferably 0.5 to 1,000 nm, more preferably 1 to 300 nm, much more preferably 2 to 200 nm, particularly preferably 3 to 100 nm from the relationship between the total number of layers and the total thickness for securing stretching properties.

The inner layers of the laminated film (3) preferably do not contain inert particles. The thickness of the laminated film (3) of the present invention is preferably 1 to 10 μm, more preferably 3 to 7 μm, much more preferably 4 to 6 μm.

<Heat Absorption Peak>

The biaxially oriented laminated film of the present invention preferably has a heat absorption peak with a heat quantity of not less than 0.5 J/g at a temperature range of 100 to 140° C. when measured with a differential scanning calorimeter (DSC).

When the biaxially oriented laminated film has the above heat absorption peak, it has excellent dimensional stability against environmental changes such as temperature and humidity variations, is suppressed from elongation by tension during processing at a high temperature, has excellent processability and is suitable for use as a base film for a magnetic recording medium.

The heat quantity of the heat absorption peak is preferably not less than 1.0 J/g, more preferably not less than 1.5 J/g. The upper limit of the heat quantity of the heat absorption peak is not particularly limited but generally not more than 5.0 J/g.

This heat absorption peak in the DSC measurement can be provided to a biaxially oriented film which is obtained by biaxial stretching and heat setting in accordance with a commonly used method, for example, by annealing. Stated more specifically, annealing the film at preferably a temperature 30° C. lower than the glass transition temperature (Tg) of the polyester to Tg, more preferably (Tg−20° C.) to (Tg−5° C.) as the film temperature is effective and preferred. When annealing is carried out at a temperature lower than the above lower limit, the above heat absorption peak is hardly obtained and the effect of suppressing elongation by tension during processing at a high temperature becomes unsatisfactory. When annealing is carried out at a temperature higher than the above upper limit, the deposition of an oligomer on the surface of the film, the transfer of the surface shape of a take-up core to the surface of the film and sticking to the surface of the film readily occur, causing inconvenience in the use of the film.

To anneal the biaxially oriented film, a method in which the biaxially oriented and heat set film is brought into contact with a heating roll to be heated without being wound up, a method in which the film is carried with heating air to be heated without contact, a method in which the wound film is heated in the same manner as described above while it is wound off, and a method in which a roll of the biaxially oriented film is heated in an heating oven are employed. The method in which a roll of the film is heated is particularly preferred because the annealing time can be easily made long enough advantageously.

The annealing time can be suitably adjusted according to the annealing method so that the above heat absorption peak is fully obtained. For example, when the film is annealed in a rolled state, it is annealed for preferably 12 to 150 hours, more preferably 24 to 120 hours. The time is preferably adjusted according to the annealing temperature. It is preferred that as the annealing temperature is lower, the annealing time should be made longer. For example, when the film is annealed at 95° C., the annealing time is preferably 48 to 120 hours and when the film is annealed at 100° C., the annealing time is preferably 24 to 72 hours. When the annealing time is too short, a satisfactory annealing effect is not obtained and the suppression of elongation during high-temperature processing becomes unsatisfactory. When the annealing time is too long, such inconvenience as transfer or sticking readily occurs and it takes too long to anneal the film, thereby reducing productivity disadvantageously.

<Production Process of Aromatic Polyester (B)>

A detailed description is subsequently given of the process for producing the aromatic polyester (B) containing the component represented by the formula (I) in the present invention.

A polyester precursor is first produced by reacting 6,6'-(alkylenedioxy)di-2-naphthoic acid or an ester forming derivative thereof and, for example, 2,6-naphthalenedicarboxylic acid, terephthalic acid or an ester forming derivative thereof with, for example, ethylene glycol. Then, the obtained polyester precursor is polymerized in the presence of a polymerization catalyst to produce the aromatic polyester (B). Solid-phase polymerization may be carried out as required.

The amount of the ethylene glycol component in the process of producing the polyester precursor is preferably 1.1 to 6 times, more preferably 2 to 5 times, much more preferably 3 to 5 times the total number of moles of all the acid components.

The reaction temperature for producing the polyester precursor is preferably a temperature higher than the boiling point of ethylene glycol, particularly preferably 190 to 250° C. When the reaction temperature is lower than 190° C., the reaction hardly proceeds and when the reaction temperature is higher than 250° C., diethylene glycol as a side-reaction product is readily produced. Although the reaction can be carried out under normal pressure, it may be carried out under increased pressure so as to boost productivity. More specifically, the reaction pressure is preferably 10 to 200 kPa in terms of absolute pressure. The reaction temperature is preferably 150 to 250° C., more preferably 180 to 230° C. The reaction time is preferably 10 minutes to 10 hours, more preferably 30 minutes to 7 hours. The polyester precursor as a reaction product is obtained by this esterification reaction.

In the reaction step for producing the polyester precursor, a known esterification or transesterification catalyst may be used. Examples of the catalyst include alkali metal compounds, alkali earth metal compounds and titanium compounds.

A description is subsequently given of a polycondensation reaction. The polycondensation temperature is preferably 230 to 280° C. which is equal to or higher than the melting point of the obtained aromatic polyester (B), more preferably a temperature 5° C. or more higher than the melting point to a temperature 30° C. higher than the melting point. In general, the polycondensation reaction is preferably carried out under a reduced pressure of 30 Pa or less. When the pressure is higher than 30 Pa, the time required for the polycondensation reaction becomes long and it is difficult to obtain an aromatic copolyester resin having a high degree of polymerization.

The polycondensation catalyst is a metal compound containing at least one metal element. The polycondensation catalyst may be used in the esterification reaction. Examples of the metal element include titanium, germanium, antimony, aluminum, nickel, zinc, tin, cobalt, rhodium, iridium, zirconium, hafnium, lithium, calcium and magnesium. Out of these, titanium, germanium, antimony, aluminum and tin are preferred, and a titanium compound is particularly preferred because it has high activity in both the esterification reaction and the polycondensation reaction.

These catalysts may be used alone or in combination. The amount of the catalyst is preferably 0.001 to 0.5 mol %, more preferably 0.005 to 0.2 mol % based on the total number of moles of the recurring units of the aromatic copolyester.

Examples of the titanium compound as the polycondensation catalyst include tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanate, ammonium oxalate titanate, titanium oxide, an orthoester or condensed orthoester of titanium, a reaction product of an orthoester or condensed orthoester of titanium and hydroxycarboxylic acid, a reaction product of an orthoester or condensed orthoester of titanium, hydroxycarboxylic acid and a phosphorus compound, and a reaction product of an orthoester or condensed orthoester of titanium and a polyhydric alcohol having at least two hydroxyl group and 2-hydroxycarboxylic acid or a base.

<Production Process of Aromatic Polyester (A)>

The aromatic polyester (A) in the present invention can be produced by the same process as that of the aromatic polyester (B) except that the amount of the component represented by the formula (I) is different.

The aromatic polyesters (A) and (B) may be mixed with another thermoplastic polymer, a stabilizer such as a ultraviolet absorbent, an antioxidant, a plasticizer, a lubricant, a flame retardant, a release agent, a pigment, a nucleating agent, a filler or glass fibers, carbon fibers and lamellar silicate as required as long as the effect of the present invention is not impaired. Examples of the another thermoplastic polymer include aliphatic polyester-based resins, polyamide-based resins, polycarbonates, ABS resin, polymethyl methacrylate, polyamide-based elastomers, polyester-based elastomers, polyether imides and polyimides.

<Film Production Process>

The biaxially oriented laminated film of the present invention is preferably produced by stretching in both the machine direction and the transverse direction to enhance molecular orientation in these directions. For example, it is preferably produced by the following process because its Young's modulus is easily improved while film forming properties are retained.

First, the above aromatic polyesters (A) and (B) are prepared as starting materials, dried, molten, laminated together in a die at a temperature of preferably the melting point (Tm: ° C.) of the polyesters for forming the respective layers to (Tm+70)° C. and extruded into a film form, or extruded into a sheet form from the die while they are molten and laminated together, and then solidified by quenching to obtain a laminated unstretched film which is then biaxially stretched. Even when the number of layers increases, the aromatic polyesters may be each divided in their channels to form a predetermined number of layers which are then laminated together alternately, discharged from a nozzle and solidified by quenching to obtain a laminated unstretched film. Only the outermost layers can be made thick or the thickness can be gradually changed in the thickness direction by changing the shape of a bifurcating channel. After the formation of alternately laminated layers, a third resin may be joined to produce a structure having an outermost layer obtained therefrom before it is extruded from the nozzle.

Cooling with a cooling drum is preferably carried out very swiftly to achieve the Young's moduli in the both directions as well as at and αh specified by the present invention and facilitate subsequent stretching. From this point of view, the temperature of the cooling drum is not such a high temperature of 80° C. as disclosed in Patent Document 3 but a low temperature of 20 to 60° C. By cooling at such a low temperature, the crystallization of the unstretched film is suppressed, thereby making it possible to carry out the subsequent stretching step smoothly.

Biaxial stretching may be sequential or simultaneous biaxial stretching. In this text, a process of producing the biaxially oriented laminated film by sequential stretching, that is, stretching the laminated film in the longitudinal direction (machine direction) and then in the transverse direction (direction orthogonal to the machine direction) and heat setting it in this order will be described as an example. The laminated film is first stretched to 3 to 10 times in the longitudinal direction at the higher glass transition temperature (Tg: ° C.) of the aromatic polyester (A) or the aromatic polyester (B) to (Tg+40)° C. Then, the monoaxially oriented laminated film is stretched to 3 to 10 times in the transverse direction at (Tg+10) to (Tg+50)° C. which is higher than the above stretching temperature in the longitudinal direction. The biaxially oriented laminated film is further heat set at a temperature lower than the melting point of the polymer and within (Tg+50) to (Tg+150)° C. for preferably 1 to 20 seconds, more preferably 1 to 15 seconds. The heat setting temperature is preferably 180 to 220° C., more preferably 190 to 210° C. As described above, when the peak temperature of tan δ on a high temperature side is low, the draw ratio in the machine direction is made high or the draw ratio in the transverse direction is made low to facilitate the orientation of the molecular chain in the machine direction.

Sequential biaxial stretching has been described above. The biaxially oriented laminated film of the present invention may be produced by simultaneous biaxial stretching in which longitudinal stretching and transverse stretching are carried out at the same time with reference to the draw ratios and the stretching temperatures which have been described above.

The method of adding the above-described inert particles in the present invention to the film layers (A) and (B) and the third layer is not particularly limited. The inert particles may be added in the stage of polymerizing resins constituting the respective layers or kneaded into these resins by means of a double-screw kneading extruder after polymerization. Preferably, a master polymer containing a larger amount of inert particles than that used in the final film is prepared in the polymerization stage and diluted with a polymer containing no inert particles to achieve a desired particle concentration because the dispersibility of the particles in the film layers is improved more easily. At this point, coarse particles are preferably removed by filtration with a filter.

A magnetic recording tape can be obtained by using the biaxially oriented laminated film of the present invention as a base film, forming a magnetic layer or a nonmagnetic layer and a magnetic layer on the flat surface of the laminated film in this order and forming a back coat layer on the traveling surface.

The present invention includes a method of using the biaxially oriented laminated film of the present invention as a base film for a magnetic recording medium. The present invention further includes a method of suppressing the elongation of a film made of an aromatic polyester containing the component represented by the formula (I) when a load is applied thereto at a high temperature by using the biaxially oriented laminated film of the present invention.

EXAMPLES

The following examples and comparative examples are provided to further illustrate the present invention. In the present invention, the characteristic properties of the examples and the comparative examples were measured and evaluated by the following methods.

(1) Intrinsic Viscosity

The intrinsic viscosity of the obtained polyester was measured at 35° C. by dissolving the polymer in a mixed solvent of p-chlorophenol and 1,1,2,2-tetrachloroethane (weight ratio of 40/60).

(2) Glass Transition Point and Melting Point

The glass transition points and the melting points of the aromatic polyesters (A) and (B) used in the respective layers were measured by DSC (Thermal Analyst 2920 of TA Instruments Co., Ltd.) at a temperature elevation rate of 20° C./min.

(3) Copolymerization Ratio

As for a glycol component, the aromatic polyesters (A) and (B) used in the respective layers were prepared, and 10 mg of each of these samples was dissolved in 0.5 ml of a mixed solution of p-chlorophenol and 1,1,2,2-tetrachloroethane (volume ratio of 3:1) at 80° C. Isopropylamine was added to and fully mixed with the resulting solution, and the amount of the glycol component was measured at 80° C. by 600 MHz $^1$H-NMR (JEOL A600 of JEOL Ltd.).

As for an aromatic dicarboxylic acid component, the aromatic polyesters (A) and (B) used in the respective layers were prepared, 50 mg of each of these samples was dissolved in 0.5 ml of a mixed solution of p-chlorophenol and 1,1,2,2-tetrachloroethane (volume ratio of 3:1) at 140° C., and the amount of the acid component was measured at 140° C. by 100 MHz $^{13}$C-NMR (JEOL A600 of JEOL Ltd.).

(4) Young's Modulus

A sample having a width of 10 mm and a length of 15 cm was cutout from the obtained film and pulled by a universal tensile tester (Tensilon (trade name) of Toyo Baldwin Co., Ltd.) at a chuck interval of 100 mm, a pulling rate of 10 mm/min and a chart rate of 500 mm/min. The Young's modulus was calculated from the tangent of a rising portion in the obtained load-elongation curve.

(5) Humidity Expansion Coefficient (αh)

A sample having a length of 15 mm and a width of 5 mm was cut out from the obtained film to ensure that the machine direction or crosswise direction of the film became the measurement direction and set in the TMA3000 of Shinkuu Riko Co., Ltd. to measure the length of the sample at a humidity of 30% RH and 70% RH in a 30° C. nitrogen atmosphere so as to calculate its humidity expansion coefficient from the following equation. The measurement direction was the longitudinal direction of the obtained sample, and the measurement was made 5 times to obtain the average value of the measurement data as αh.

$$\alpha h = (L70 - L30)/(L30 \times \Delta H)$$

In the above equation, L30 is the length (mm) of the sample at 30% RH, L70 is the length (mm) of the sample at 70% RH, and ΔH is 40 (=70−30) % RH.

(6) Thicknesses of Laminated Film and Film Layers 10 laminated films were joined together while air between layers was removed to measure the thickness of the resulting laminate by using the MDC-25S dial gauge of Mitutoyo Corporation in accordance with the 10 films lamination method specified in JIS C2151 so as to calculate the thickness of each laminated film. This measurement was repeated 10 times to obtain the average value as the thickness of each laminated film.

As for the thicknesses of the film layer (A) and the film layer (B), a film piece was fixed and shaped by an epoxy resin and cut into a super thin piece having a thickness of about 60 nm (cut in parallel to the machine direction and the thickness direction of the film) with a microtome. This super thin film sample was observed through a transmission electron microscope (H-800 of Hitachi, Ltd.) so as to obtain the thicknesses of the layers A and B from the boundary therebetween.

(7) Coating Nonuniformity Caused by Elongation During Processing

A nonmagnetic coating composition and a magnetic coating composition having the following compositions were applied to one side of a film having a width of 500 mm and a length of 500 m with a die coater under a tension of 20 MPa to ensure that the thickness of a nonmagnetic layer and the thickness of a magnetic layer after drying became 1.2 μm and 0.1 μm, respectively, magnetically aligned and dried at 120° C. for 30 seconds. Further, the coating layers were calendered with a small-sized test calendar device (steel rolls/nylon rolls, five stages) at a temperature of 70° C. and a linear pressure of 200 kg/cm and then cured at 70° C. for 48 hours. The obtained film having a magnetic layer was evaluated for coating non-uniformity by a visual check based on the following criteria. The visual check was carried out by installing a fluorescent lamp behind the film and counting light leaks through the magnetic layer. A back coat layer was formed on this film having a magnetic layer as required, the film was slit to a width of 12.65 mm, and the obtained film was set in a cassette to obtain a magnetic recording tape.

○: less than 2 uncoated portions/250 m²
Δ: 2 or more and less than 10 uncoated portions/250 m²
X: 10 or more uncoated portions/250 m² composition of nonmagnetic coating composition titanium dioxide fine particles: 100 parts by weight
  Eslec A (vinyl chloride/vinyl acetate copolymer of Sekisui Chemical Co., Ltd.): 10 parts by weight
  Nipporan 2304 (polyurethane elastomer of Nippon Polyurethane Co., Ltd.): 10 parts by weight
  Colonate L (polyisocyanate of Nippon Polyurethane Co., Ltd.): 5 parts by weight
  Lecithin: 1 part by weight
  Methyl ethyl ketone: 75 parts by weight
  Methyl isobutyl ketone: 75 parts by weight
  Toluene: 75 parts by weight
  Carbon black: 2 parts by weight
  Lauric acid: 1.5 parts by weight
  Composition of magnetic coating composition
  Iron (length: 0.3 μm, needle ratio: 10/1, 1800 Oersted): 100 parts by weight
  Eslec A (vinyl chloride/vinyl acetate of Sekisui Chemical Co., Ltd.): 10 parts by weight
  Nipporan 2304 (polyurethane elastomer of Nippon Polyurethane Co., Ltd.): 10 parts by weight
  Colonate L (polyisocyanate of Nippon Polyurethane Co., Ltd.): 5 parts by weight
  Lecithin: 1 part by weight
  Methyl ethyl ketone: 75 parts by weight
  Methyl isobutyl ketone: 75 parts by weight
  Toluene: 75 parts by weight
  Carbon black: 2 parts by weight
  Lauric acid: 1.5 parts by weight (8) Measurement of Viscoelasticity The film sample was cut to a length of 35 mm in the machine direction (MD) of the film and to a width of 3 mm in the transverse direction (TD) and heated from room temperature to 200° C. at a rate of 5° C./min under a load of 3 g at a frequency of 1 Hz by using the Vibron device (DDV-01FP) of Orientec Co., Ltd. to measure its viscoelasticity in MD.

The peak temperature and peak intensity of tan δ were obtained from the obtained chart.

(9) Curling

The film sample was cut to a length of 250 mm in the machine direction (MD) of the film and to a width of 100 mm in the transverse direction (TD) and heated at 120° C. under a load of 20 MPa for 1 minute to evaluate the degree of curling based on the following criteria.

○: no curling
Δ: only four corners of the film sample slightly curl
X: film sample curls like a cylinder

(10) Temperature Expansion Coefficient (αt)

A sample having a length of 15 mm and a width of 5 mm was cut out from the obtained film to ensure that the machine direction or crosswise direction of the film became the measurement direction, set in the TMA3000 of Shinkuu Riko Co., Ltd., pre-treated in a nitrogen atmosphere (0% RH) at 60° C. for 30 minutes and then cooled to room temperature. Thereafter, the sample was heated from 25° C. to 70° C. at a temperature elevation rate of 2° C./min to measure its length at each temperature in order to calculate its temperature expansion coefficient (αt) from the following equation. The measurement direction was the longitudinal direction of the obtained sample, and the measurement was made 5 times to obtain the average value of the measurement data.

$$\alpha t = \{(L60-L40)\}/(L40 \times \Delta T) + 0.5$$

In the above equation, L40 is the length (mm) of the sample at 40° C., L60 is the length (mm) of the sample at 60° C., ΔT is 20 (=60−40)° C., and 0.5 is the temperature expansion coefficient (ppm/° C.) of quartz glass.

(11) Center Plane Average Roughness (Ra)

The center plane average roughness Ra was obtained from the following equation with surface analyzing software incorporated in the non-contact 3-D surface structure analyzing microscope (NewView 5022) of Zygo Co., Ltd. at a measurement magnification of 25× and a measurement area of 283 μm×213 μm (=0.0603 mm²).

$$\sigma = \left( \sum_{i=1}^{n} (Di-D)^2/n \right)^{\frac{1}{2}} / D$$

$$D = \sum_{i=1}^{n} Di/n$$

σ: relative standard deviation
D: number average particle diameter (μm)
Di: particle diameter (μm)
n: number of particles Zjk is a height in a 2-D roughness chart at a coordinate position of a j-th point and a k-th point in the measurement direction (283 μm) and a direction (213 μm) orthogonal to the measurement direction both of which are divided into M sections and N sections, respectively.

(12) Windability

A film roll after film formation was cut into 100 pieces having a width of 1 m and a length of 10,000 m, and the number of pieces rated ○ based on the following criteria were accepted and expressed as the number of acceptable pieces out of 100 pieces.

◎: no defect
○: slight creases or dents are existent
Δ: noticeable creases, dents or projections are existent
X: two or more out of creases, dents and projections are existent

(13) Preparation of Data Storage (Magnetic Tape)

A nonmagnetic coating composition and a magnetic coating composition having the following compositions were applied to one side of a film having a width of 500 mm and a length of 850 m with a die coater under a tension of 20 MPa to ensure that the thickness of a nonmagnetic layer and the thickness of a magnetic layer after drying became 1.2 µm and 0.1 µm, respectively, magnetically aligned and dried at 120° C. for 30 seconds. Further, the coating layers were calendered with a small-sized test calendar device (steel rolls/nylon rolls, five stages) at a temperature of 70° C. and a linear pressure of 200 kg/cm and then cured at 70° C. for 48 hours. After a back coat having the following composition was formed on the opposite side to the magnetic layer to a thickness of the solid content of 0.5 µm, the obtained laminate was calendered at a temperature of 85° C. and a linear pressure of 200 kg/cm with a small-sized test calendar device (steel/nylon rolls, 5 stages) and wound up. The above gray tape was slit to a width of ½ inch and set in an LTO case to obtain a data storage cartridge having a length of 850 m.

<Composition of Nonmagnetic Coating Composition>
nonmagnetic inorganic powder (α-iron oxide: average long-axis length: 0.15 µm, average needle ratio: 7, BET specific surface area: 52 m$^2$/g): 100 parts by weight
Eslec A (vinyl chloride/vinyl acetate copolymer of Sekisui Chemical Co., Ltd.): 10 parts by weight
Nipporan 2304 (polyurethane elastomer of Nippon Polyurethane Co., Ltd.): 10 parts by weight
Colonate L (polyisocyanate of Nippon Polyurethane Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black (average particle diameter: 20 nm): 2 parts by weight
Lauric acid: 1.5 parts by weight <Composition of Magnetic Coating Composition>
magnetic powder (NF30x (trade name) of Toda Kogyo Co., Ltd.): 100 parts by weight
Eslec A (vinyl chloride/vinyl acetate copolymer of Sekisui Chemical Co., Ltd.): 10 parts by weight
Nipporan 2304 (polyurethane elastomer of Nippon Polyurethane Co., Ltd.): 10 parts by weight
Colonate L (polyisocyanate of Nippon Polyurethane Co., Ltd.): 5 parts by weight
Lecithin: 1 part by weight
Methyl ethyl ketone: 75 parts by weight
Methyl isobutyl ketone: 75 parts by weight
Toluene: 75 parts by weight
Carbon black (average particle diameter: 20 nm): 2 parts by weight
Lauric acid: 1.5 parts by weight <Composition of Back Coat>
carbon black (average particle diameter: 20 nm): 95 parts by weight
carbon black (average particle diameter: 280 nm): 10 parts by weight
α-alumina: 0.1 part by weight
modified polyurethane: 20 parts by weight
modified vinyl chloride copolymer: 30 parts by weight
cyclohexanone: 200 parts by weight
methyl ethyl ketone: 300 parts by weight
toluene: 100 parts by weight

(14) Electromagnetic Conversion Characteristics

BBSNR (the ratio of average signal intensity and broadband integral average noise) of the magnetic tape prepared by the method described in the above paragraph (13) was measured by using the commercially available LTO-G3 drive (manufactured by IBM, equipped with an MR read head). The result was evaluated based on the result of Example 38.

(15) TMA (Elongation Percentage at the Time of Temperature Elevation by Heat Analyzer)

A film was cut to a width of 4 mm, and the obtained film sample was set in the TMA/SS6000 of Seiko Instruments Co., Ltd. at a chuck interval of 20 mm to measure its length ($L_{30}$) at 30° C. and its length ($L_{100}$) at 100° C. under a load of 20 MPa by increasing the temperature up to 180° C. at a temperature elevation rate of 5° C./min so as to obtain its elongation percentage ($L_{100}$–$L_{30}$)/$L_{30}$(%)).

It can be said that as the elongation percentage becomes lower, elongation during processing at a high temperature becomes smaller.

(16) Heat Absorption Peak Temperature (Tk(° C.) and heat Absorption Energy ΔHK (J/g)

A 20 mg biaxially oriented film was set in DSC Q100 (trade name) of TA Instruments Co., Ltd. to carry out temperature modulation DSC measurement in an $N_2$ stream at a temperature elevation rate of ±2° C./min and a temperature modulation of ±2° C./min. The peak temperature (Tk (° C.)) of a heat absorption peak existent at a predetermined temperature range was obtained from an irreversible heat flow curve out of the obtained data, and heat absorption energy (ΔHk (J/g)) was obtained from the area of the heat absorption peak (the area of a portion shifted from a straight line connecting the heat absorption start temperature and the end temperature toward the heat absorption side).

Example 1

An esterification reaction and a transesterification reaction were carried out between dimethyl 2,6-naphthalenedicarboxylate and ethylene glycol in the presence of titanium tetrabutoxide and then a polycondensation reaction was carried out to obtain polyethylene-2,6-naphthalate (A-1) for the film layer (A) which comprised a diethylene glycol component in an amount of 1.5 mol % of the total of all the glycol components. 0.1 wt % of silica particles having an average particle diameter of 0.15 µm were contained in the polyethylene-2,6-naphthalate (A-1) based on the weight of the resin composition obtained before the polycondensation reaction.

Further, an esterification reaction and a transesterification reaction were carried out among dimethyl 2,6-naphthalenedicarboxylate, 6,6'-(ethylenedioxy)di-2-naphthoic acid and ethylene glycol in the presence of titanium tetrabutoxide and then a polycondensation reaction was carried out to obtain an aromatic polyester (B-1) for the film layer (B) which comprised 73 mol % of a 2,6-naphthalenedicarboxylic acid component and 27 mol % of a 6,6'-(ethylenedioxy)di-2-naphthoic acid component based on the total of all the acid components and 98 mol % of an ethylene glycol component and 2 mol % of a diethylene glycol component based on the total of all the glycol components. 0.15 wt % of silica particles having an average particle diameter of 0.3 µm and 0.10 wt % of silica particles having an average particle diameter of 0.15 µm were contained in the aromatic polyester (B-1) based on the weight of the resin composition obtained before the polycondensation reaction. This aromatic polyester (B-1) had a melting point of 240° C. and a glass transition temperature of 117° C.

The aromatic polyesters (A-1) and (B-1) obtained as described above were supplied into different extruders and laminated together in a die at 295° C. to ensure that the thickness ratio became 1:2, and the resulting laminate was extruded into a sheet form on a rotating cooling drum having a temperature of 50° C. while it was molten to obtain an unstretched laminated film. This film was heated with an IR heater from above between two rollers which differed in revolution in the machine direction to ensure that the film surface temperature became 135° C. and stretched to 5.3 times in the longitudinal direction (machine direction) to obtain a monoaxially oriented film. This monoaxially oriented film was guided to a stenter to be stretched to 6.0 times in the transverse direction (crosswise direction) at 145° C. and then heat set at 190° C. for 5 seconds to obtain a biaxially oriented laminated film having a thickness of 5 µm. The characteristic properties of the obtained film are shown in Table 1.

Example 2

The procedure of Example 1 was repeated to obtain a biaxially oriented laminated film except that the inert particles to be contained were changed as shown in Table 1 and the thickness ratio of the layer B to the layer A was changed to 1:1. The characteristic properties of the obtained film are shown in Table 1.

Example 3

The procedure of Example 1 was repeated to obtain a biaxially oriented laminated film except that the inert particles to be contained were changed as shown in Table 1 and the thickness ratio of the layer B to the layer A was changed to 4:1. The characteristic properties of the obtained film are shown in Table 1.

Example 4

The procedure of Example 1 was repeated to obtain a biaxially oriented laminated film except that the inert particles to be contained were changed as shown in Table 1. The characteristic properties of the obtained film are shown in Table 1.

Example 5

The procedure of Example 1 was repeated to obtain a biaxially oriented laminated film except that the draw ratio in the longitudinal direction was changed to 5.5 times and the draw ratio in the transverse direction was changed to 5.3 times. The characteristic properties of the obtained film are shown in Table 1.

Example 6

The procedure of Example 1 was repeated to obtain a biaxially oriented laminated film except that the draw ratio in the longitudinal direction was changed to 5.0 times and the draw ratio in the transverse direction was changed to 7.5 times. The characteristic properties of the obtained film are shown in Table 1.

Example 7

The procedure of Example 1 was repeated to obtain a biaxially oriented laminated film except that the aromatic polyester of the film layer B comprised 65 mol % of a 2,6-naphthalenedicarboxylic acid component and 35 mol % of a 6,6'-(alkylenedioxy)di-2-naphthoic acid component based on the total of all the acid components. The characteristic properties of the obtained film are shown in Table 1.

Example 8

The procedure of Example 1 was repeated to obtain a biaxially oriented laminated film except that the aromatic polyester of the film layer B comprised 72 mol % of a 2,6-naphthalenedicarboxylic acid component and 18 mol % of a 6,6'-(alkylenedioxy)di-2-naphthoic acid component based on the total of all the acid components. The characteristic properties of the obtained film are shown in Table 1.

Comparative Example 1

An esterification reaction and a transesterification reaction were carried out among dimethyl 2,6-naphthalenedicarboxylate, 6,6'-(ethylenedioxy)di-2-naphthoic acid and ethylene glycol in the presence of titanium tetrabutoxide and then a polycondensation reaction was carried out to obtain an aromatic polyester (A-9) for the film layer (A) which comprised 73 mol % of a 2,6-naphthalenedicarboxylic acid component and 27 mol % of a 6,6'-(alkylenedioxy)di-2-naphthoic acid component based on the total of all the acid components and 98 mol % of an ethylene glycol component and 2 mol % of a diethylene glycol component based on the total of all the glycol components. 0.10 wt % of silica particles having an average particle diameter of 0.15 µm were contained in the aromatic polyester based on the weight of the resin composition obtained before the polycondensation reaction. The procedure of Example 1 was repeated to obtain a biaxially oriented laminated film except that the aromatic polyester of the film layer A was changed to the polyester (A-9), the draw ratio in the longitudinal direction was changed to 5.8 times, the draw ratio in the transverse direction was changed to 7.7 times, and the stretching temperature in the transverse direction was changed to 140° C. The characteristic properties of the obtained film are shown in Table 1.

Comparative Example 2

The procedure of Example 1 was repeated to obtain a biaxially oriented laminated film except that the film was changed to a single-layer film consisting of the film layer B. The characteristic properties of the obtained film are shown in Table 1.

Comparative Example 3

An esterification reaction and a transesterification reaction were carried out between dimethyl 2,6-naphthalenedicarboxylate and ethylene glycol in the presence of titanium tetrabutoxide and then a polycondensation reaction was carried out to obtain polyethylene-2,6-naphthalate (B-11) for the film layer (B) which had an intrinsic viscosity of 0.62 dl/g and comprised 1.5 mol % of a diethylene glycol component based on the total of all the glycol components. 0.15 wt % of silica particles having an average particle diameter of 0.30 µm and 0.10 wt % of silica particles having an average particle diameter of 0.15 µm were contained in the polyethylene-2,6-naphthalate (B-11) based on the weight of the resin composition obtained before the polycondensation reaction. The procedure of Example 1 was repeated to obtain a biaxially oriented laminated film except that the aromatic polyester of the film layer B was changed to the polyester (B-11), the draw ratio in the longitudinal direction was changed to 5.0 times, the draw ratio in the transverse direction was changed to 6.4 times, and the stretching temperature in the transverse direction was changed to 150° C. The characteristic properties of the obtained film are shown in Table 1.

Example 9

The procedure of Example 1 was repeated to obtain a biaxially oriented laminated film except that the thickness ratio of the layer B to the layer A was changed to 1:2. The characteristic properties of the obtained film are shown in Table 1.

Comparative Example 4

The procedure of Example 1 was repeated to obtain a biaxially oriented laminated film except that the aromatic polyester of the film layer A was changed to a polyester comprising 94 mol % of a 2,6-naphthalenedicarboxylic acid component and 6 mol % of a 6,6'-(alkylenedioxy)di-2-naphthoic acid component based on the total of all the acid components. The characteristic properties of the obtained film are shown in Table 1.

Example 10

The procedure of Example 1 was repeated to obtain a biaxially oriented laminated film except that the inert particles to be contained were changed as shown in Table 1, the laminate structure was changed to a three-layer structure consisting of layer A, layer B and layer A as shown in Table 1, and the thickness ratio was changed to 1/4/1. The characteristic properties of the obtained film are shown in Table 1.

Example 11

The procedure of Example 1 was repeated to obtain a biaxially oriented laminated film except that the aromatic polyester of the film layer A was changed to a polyester which comprised 98 mol % of a 2,6-naphthalenedicarboxylic acid component and 2 mol % of a 6,6'-(alkylenedioxy)di-2-naphthoic acid component based on the total of all the acid components. The characteristic properties of the obtained film are shown in Table 1.

TABLE 1

| | Film layer B | | | | | | | |
|---|---|---|---|---|---|---|---|---|
| | Particles (1) | | | particles (2) | | | | |
| | Type | average particle diameter μm | content % by weight | Type | average particle diameter μm | content % by weight | content of ANA mol % | Tg ° C. | Tm ° C. |
| Ex. 1 | Silica | 0.30 | 0.15 | Silica | 0.15 | 0.10 | 27 | 117 | 238 |
| Ex. 2 | silicone | 0.50 | 0.02 | Silica | 0.10 | 0.15 | 27 | 117 | 238 |
| Ex. 3 | Silica | 0.15 | 0.15 | Silica | 0.05 | 0.30 | 27 | 117 | 238 |
| Ex. 4 | Pst | 0.30 | 0.07 | alumina | 0.06 | 0.20 | 27 | 117 | 238 |
| Ex. 5 | Silica | 0.30 | 0.15 | Silica | 0.15 | 0.10 | 27 | 117 | 238 |
| Ex. 6 | Silica | 0.30 | 0.15 | Silica | 0.15 | 0.10 | 27 | 117 | 238 |
| Ex. 7 | Silica | 0.30 | 0.15 | Silica | 0.15 | 0.10 | 35 | 116 | 243 |
| Ex. 8 | Silica | 0.30 | 0.15 | Silica | 0.15 | 0.10 | 18 | 117 | 255 |
| C. Ex. 1 | Silica | 0.30 | 0.15 | Silica | 0.15 | 0.10 | 27 | 117 | 238 |
| C. Ex. 2 | Silica | 0.30 | 0.15 | Silica | 0.15 | 0.10 | 27 | 117 | 238 |
| C. Ex. 3 | Silica | 0.30 | 0.15 | Silica | 0.15 | 0.10 | 0 | 120 | 270 |
| Ex. 9 | Silica | 0.30 | 0.15 | Silica | 0.15 | 0.10 | 27 | 117 | 238 |
| C. Ex. 4 | Silica | 0.30 | 0.15 | Silica | 0.15 | 0.10 | 27 | 117 | 238 |
| Ex. 10 | Silica | 0.30 | 0.15 | | | | 27 | 117 | 238 |
| Ex. 11 | Silica | 0.30 | 0.15 | Silica | 0.15 | 0.10 | 27 | 117 | 238 |

| | Film layer A | | | | | |
|---|---|---|---|---|---|---|
| | Particles | | | | | |
| | Type | average particle diameter μm | content % by weight | content of ANA mol % | Tg ° C. | Tm ° C. |
| Ex. 1 | Silica | 0.15 | 0.10 | 0 | 120 | 270 |
| Ex. 2 | Silica | 0.10 | 0.15 | 0 | 120 | 270 |
| Ex. 3 | Silica | 0.05 | 0.30 | 0 | 120 | 270 |
| Ex. 4 | alumina | 0.06 | 0.20 | 0 | 120 | 270 |
| Ex. 5 | Silica | 0.15 | 0.10 | 0 | 120 | 270 |
| Ex. 6 | Silica | 0.15 | 0.10 | 0 | 120 | 270 |
| Ex. 7 | Silica | 0.15 | 0.10 | 0 | 120 | 270 |
| Ex. 8 | Silica | 0.15 | 0.10 | 0 | 120 | 270 |
| C. Ex. 1 | Silica | 0.15 | 0.10 | 27 | 117 | 238 |
| C. Ex. 2 | — (single layer) | | | | | |
| C. Ex. 3 | Silica | 0.15 | 0.10 | 0 | 120 | 270 |
| Ex. 9 | Silica | 0.15 | 0.10 | 0 | 120 | 270 |
| C. Ex. 4 | Silica | 0.15 | 0.10 | 6 | 119 | 255 |
| Ex. 10 | Silica | 0.3 | 0.15 | 0 | 120 | 270 |
| Ex. 11 | Silica | 0.15 | 0.10 | 2 | 120 | 265 |

| | Film thickness | | |
|---|---|---|---|
| | thickness ratio Layer B/layer A | thickness ratio layer B/all layers % | all layers |
| Ex. 1 | 2/1 | 67 | 5.0 |
| Ex. 2 | 1/1 | 50 | 5.0 |
| Ex. 3 | 4/1 | 80 | 5.0 |

TABLE 1-continued

| | | | |
|---|---|---|---|
| Ex. 4 | 2/1 | 67 | 5.0 |
| Ex. 5 | 2/1 | 67 | 5.0 |
| Ex. 6 | 2/1 | 67 | 5.0 |
| Ex. 7 | 2/1 | 67 | 5.0 |
| Ex. 8 | 2/1 | 67 | 5.0 |
| C. Ex. 1 | 2/1 | 67 | 5.0 |
| C. Ex. 2 | — | — | 5.0 |
| C. Ex. 3 | 2/1 | 67 | 5.0 |
| Ex. 9 | 1/2 | 33 | 5.0 |
| C. Ex. 4 | 2/1 | 67 | 5.0 |
| Ex. 10 | A/B/A = 1/4/1 | 67 | 5.0 |
| Ex. 11 | 2/1 | 67 | 5.0 |

| | characteristic properties of film | | | | | | | | | |
|---|---|---|---|---|---|---|---|---|---|---|
| | Young's modulus(Y) GPa | | humidity expansion coefficient($\alpha h$) ppm/% RH | | temperature expansion coefficient($\alpha t$) ppm/° C. | | surface roughness nm | | tan$\delta$ peak temperature ° C. | coating nonuniformity |
| | MD | TD | MD | TD | MD | TD | Side B | side A | | |
| Ex. 1 | 5.5 | 7.1 | 8.2 | 6.1 | 12.9 | 4.8 | 8.0 | 3.0 | 147 | ○ |
| Ex. 2 | 5.5 | 7.1 | 9.3 | 7.1 | 13.8 | 5.0 | 7.6 | 2.6 | 147 | ○ |
| Ex. 3 | 5.5 | 7.2 | 6.5 | 5.1 | 11.0 | 4.2 | 8.7 | 3.5 | 147 | Δ |
| Ex. 4 | 5.5 | 7.1 | 8.2 | 6.1 | 12.9 | 4.8 | 7.3 | 2.9 | 147 | ○ |
| Ex. 5 | 7.6 | 6.1 | 5.6 | 7.3 | 2.0 | 10.5 | 7.9 | 3.2 | 150 | ○ |
| Ex. 6 | 5.3 | 8.6 | 8.5 | 4.6 | 14.1 | −3.7 | 8.1 | 3.1 | 146 | ○ |
| Ex. 7 | 5.5 | 7.1 | 6.0 | 4.9 | 8.1 | 4.7 | 8.6 | 3.2 | 147 | ○ |
| Ex. 8 | 5.5 | 7.1 | 9.5 | 7.5 | 14.0 | 5.1 | 7.5 | 2.8 | 147 | ○ |
| C. Ex. 1 | 5.8 | 8.5 | 5.6 | 4.4 | 7.5 | −2.6 | 8.0 | 3.6 | 125 | X |
| C. Ex. 2 | 5.8 | 8.5 | 5.6 | 4.4 | 7.5 | −2.6 | 8.2 | 8.1 | 125 | X |
| C. Ex. 3 | 5.5 | 9.5 | 13.5 | 8.6 | 14.0 | −3.8 | 7.3 | 2.3 | 155 | ○ |
| Ex. 9 | 5.5 | 7.1 | 12.0 | 7.3 | 13.0 | 5.0 | 6.3 | 2.0 | 147 | ○ |
| C. Ex. 4 | 5.5 | 7.1 | 6.1 | 4.7 | 12.3 | 4.8 | 8.0 | 3.1 | 130 | X |
| Ex. 10 | 5.5 | 7.1 | 8.2 | 6.1 | 12.9 | 4.8 | 6.3 | 6.2 | 147 | ○ |
| Ex. 11 | 5.5 | 7.1 | 8.0 | 5.9 | 12.9 | 4.9 | 8.0 | 3.1 | 144 | ○ |

Ex.: Example
C. Ex.: Comparative Example

In Table 1, Pst means crosslinked polystyrene particles, and ANA means the content of the 6,6'-(alkylenedioxy)di-2-naphthoic acid component based on the total number of moles of all the acid components. As for the surface roughness in Example 10, the side in contact with the cooling drum is designated as side B and the opposite side is designated as side A.

Example 12

A transesterification reaction was carried out between dimethyl 2,6-naphthalenedicarboxylate and ethylene glycol in the presence of titanium tetrabutoxide and then a polycondensation reaction was carried out to obtain polyethylene-2,6-naphthalate (A-1) for the film layer (A) which comprised 1.5 mol % of a diethylene glycol component based on the total of all the glycol components. 0.3 wt % of silica particles having an average particle diameter of 0.3 μm and 0.2 wt % of silica particles having an average particle diameter of 0.15 μm were contained in the polyethylene-2,6-naphthalate (A-1) based on the weight of the resin composition obtained before the polycondensation reaction.

Further, an esterification reaction and a transesterification reaction were carried out among dimethyl 2,6-naphthalenedicarboxylate, 6,6'-(ethylenedioxy)di-2-naphthoic acid and ethylene glycol in the presence of titanium tetrabutoxide and then a polycondensation reaction was carried out to obtain an aromatic polyester (B-1) for the film layer (B) which comprised 73 mol % of a 2,6-naphthalenedicarboxylic acid component and 27 mol % of a 6,6'-(alkylenedioxy)di-2-naphthoic acid component based on the total of all the acid components and 98 mol % of an ethylene glycol component and 2 mol % of a diethylene glycol component based on the total of all the glycol components. This aromatic polyester (B-1) had a melting point of 240° C. and a glass transition temperature of 117° C.

The aromatic polyesters (A-1) and (B-1) obtained as described above were dried at 170° C. for 6 hours, supplied into extruders and heated up to 295° C. to be molten, the polyester for the layer (A-1) was divided to form 101 layers, the polyester for the layer (B-1) was divided to form 100 layers, these layers were laminated together alternately by a multi-layer feed block device and guided into a die while they were kept laminated, and the resulting laminate was extruded into a sheet form on a rotating cooling drum having a temperature of 50° C. while it was molten to obtain an unstretched multi-layer laminated film consisting of 201 alternating layers (A-1) and layers (B-1). The delivery ratio of the layer B to the layer A was 2:1. This film was heated with an IR heater from above between two rollers which differed in revolution in the machine direction to ensure that the film surface temperature became 135° C. and stretched to 5.3 times in the longitudinal direction (machine direction) to obtain a monoaxially oriented film. This monoaxially oriented film was guided to a stenter to be stretched to 6.0 times in the transverse direction (crosswise direction) at 145° C. and then heat set at 190° C. for 5 seconds to obtain a biaxially oriented multi-layer laminated film having a thickness of 5 μm. The characteristic properties of the obtained film are shown in Table 2.

Example 13

The procedure of Example 12 was repeated to obtain a biaxially oriented laminated film except that the delivery ratio of the layer B to the layer A was changed to 1:1. The characteristic properties of the obtained film are shown in Table 2.

Example 14

The procedure of Example 12 was repeated to obtain a biaxially oriented laminated film except that the delivery ratio of the layer B to the layer A was changed to 4:1. The characteristic properties of the obtained film are shown in Table 2.

Example 15

The procedure of Example 12 was repeated to obtain a biaxially oriented laminated film except that the number of the layers A was changed to 51 and the number of the layers B was changed to 50, thereby making a total of 101 layers. The characteristic properties of the obtained film are shown in Table 2.

Example 16

The procedure of Example 12 was repeated to obtain a biaxially oriented laminated film except that the draw ratio in the longitudinal direction was changed to 5.5 times and the draw ratio in the transverse direction was changed to 5.3 times. The characteristic properties of the obtained film are shown in Table 2.

Example 17

The procedure of Example 12 was repeated to obtain a biaxially oriented laminated film except that the draw ratio in the longitudinal direction was changed to 5.0 times and the draw ratio in the transverse direction was changed to 7.5 times. The characteristic properties of the obtained film are shown in Table 2.

Example 18

The procedure of Example 12 was repeated to obtain a biaxially oriented laminated film except that the aromatic polyester of the film layer B comprised 65 mol % of a 2,6-naphthalenedicarboxylic acid component and 35 mol % of a 6,6'-(ethylenedioxy)di-2-naphthoic acid component based on the total of all the acid components. The characteristic properties of the obtained film are shown in Table 2.

Example 19

The procedure of Example 12 was repeated to obtain a biaxially oriented laminated film except that the aromatic polyester of the film layer B comprised 82 mol % of a 2,6-naphthalenedicarboxylic acid component and 18 mol % of a 6,6'-(ethylenedioxy)di-2-naphthoic acid component based on the total of all the acid components. The characteristic properties of the obtained film are shown in Table 2.

Example 20

The procedure of Example 12 was repeated to obtain a biaxially oriented laminated film except that the aromatic polyester of the film layer A comprised 98 mol % of a 2,6-naphthalenedicarboxylic acid component and 2 mol % of a 6,6'-(ethylenedioxy)di-2-naphthoic acid component based on the total of all the acid components. The characteristic properties of the obtained film are shown in Table 2.

Comparative Example 5

An esterification reaction and a transesterification reaction were carried out among dimethyl 2,6-naphthalenedicarboxylate, 6,6'-(ethylenedioxy)di-2-naphthoic acid and ethylene glycol in the presence of titanium tetrabutoxide and then a polycondensation reaction was carried out to obtain an aromatic polyester (A-2) for the film layer (A) which comprised 73 mol % of a 2,6-naphthalenedicarboxylic acid component and 27 mol % of a 6,6'-(alkylenedioxy)di-2-naphthoic acid component based on the total of all the acid components and 98 mol % of an ethylene glycol component and 2 mol % of a diethylene glycol component based on the total of all the glycol components. 0.3 wt % of silica particles having an average particle diameter of 0.3 μm and 0.2 wt % of silica particles having an average particle diameter of 0.15 μm were contained in this aromatic polyester based on the weight of the resin composition obtained before the polycondensation reaction. The procedure of Example 12 was repeated to obtain a biaxially oriented multi-layer laminated film except that the aromatic polyester of the film layer A was changed to the polyester (A-2), the draw ratio in the longitudinal direction was changed to 5.8 times, the draw ratio in the transverse direction was changed to 7.7 times, and the stretching temperature in the transverse direction was changed to 140° C. The characteristic properties of the obtained film are shown in Table 2.

Comparative Example 6

The procedure of Example 12 was repeated to obtain a biaxially oriented film except that the film was changed to a single-layer film consisting of the film layer B. 0.3 wt % of silica particles having an average particle diameter of 0.3 μm and 0.2 wt % of silica particles having an average particle diameter of 0.15 μm were contained in the film layer B based on the weight of the resin composition obtained before the polycondensation reaction. The characteristic properties of the obtained biaxially oriented film are shown in Table 2.

Comparative Example 7

An esterification reaction and a transesterification reaction were carried out between dimethyl 2,6-naphthalenedicarboxylate and ethylene glycol in the presence of titanium tetrabutoxide and then a polycondensation reaction was carried out to obtain polyethylene-2,6-naphthalate (B-2) for the film layer (B) which had an intrinsic viscosity of 0.62 dl/g and comprised 1.5 mol % of a diethylene glycol component based on the total of all the glycol components. The procedure of Example 12 was repeated to obtain a biaxially oriented multi-layer laminated film except that the aromatic polyester of the film layer B was changed to the polyester (B-2), the draw ratio in the longitudinal direction was changed to 5.0 times, the draw ratio in the transverse direction was changed to 6.4 times, and the stretching temperature in the transverse direction was changed to 150° C. The characteristic properties of the obtained film are shown in Table 2.

Example 21

An aromatic polyester (B-3) for the film layer (B) which comprised 79 mol % of a 2,6-naphthalenedicarboxylic acid component and 21 mol % of a 6,6'-(alkylenedioxy)di-2-naphthoic acid component based on the total of all the acid components and 98 mol % of an ethylene glycol component and 2 mol % of a diethylene glycol component based on the total of all the glycol components was used in place of the aromatic polyester (B-1) in Example 12. This aromatic polyester (B-3) had a melting point of 247° C. and a glass transition temperature of 118° C.

The procedure of Example 12 was repeated to obtain a biaxially oriented multi-layer laminated film having a thickness of 5 μm except that the aromatic polyester (A-1) and (B-3) obtained as described above were divided to form 25 layers (A-1) and 24 layers (B-3), the draw ratio in the longitudinal direction (machine direction) was changed to 3.8 times, the draw ratio in the transverse direction was changed to 6.0 times, and the stretching temperature in the transverse direction was changed to 135° C. The characteristic properties of the obtained film are shown in Table 2.

Example 22

The procedure of Example 21 was repeated to obtain a biaxially oriented multi-layer laminated film except that the draw ratio in the longitudinal direction was changed to 5.3 times. The characteristic properties of the obtained film are shown in Table 2.

Example 23

The procedure of Example 21 was repeated to obtain a biaxially oriented multi-layer laminated film except that the delivery ratio of the layer B to the layer A was changed to 4:1. The characteristic properties of the obtained film are shown in Table 2.

Example 24

The procedure of Example 21 was repeated to obtain a biaxially oriented multi-layer laminated film except that the stretching temperature in the transverse direction was changed to 140° C. The characteristic properties of the obtained film are shown in Table 2.

Example 25

The procedure of Example 24 was repeated to obtain a biaxially oriented multi-layer laminated film except that the draw ratio in the longitudinal direction was changed to 5.3 times. The characteristic properties of the obtained film are shown in Table 2.

Example 26

The procedure of Example 24 was repeated to obtain a biaxially oriented multi-layer laminated film except that the delivery ratio of the layer B to the layer A was changed to 1:1. The characteristic properties of the obtained film are shown in Table 2.

Example 27

The procedure of Example 26 was repeated to obtain a biaxially oriented multi-layer laminated film except that the draw ratio in the longitudinal direction was changed to 5.3 times. The characteristic properties of the obtained film are shown in Table 2.

Example 28

The procedure of Example 21 was repeated to obtain a biaxially oriented multi-layer laminated film except that the aromatic polyester for the film layer B was changed to an aromatic polyester comprising 85 mol % of a 2,6-naphthalenedicarboxylic acid component and 15 mol % of a 6,6'-(ethylenedioxy)di-2-naphthoic acid component based on the total of all the acid components and the stretching temperature in the transverse direction was changed to 140° C. The characteristic properties of the obtained film are shown in Table 2.

Example 29

The procedure of Example 28 was repeated to obtain a biaxially oriented multi-layer laminated film except that the draw ratio in the longitudinal direction was changed to 5.3 times. The characteristic properties of the obtained film are shown in Table 2.

Example 30

The procedure of Example 28 was repeated to obtain a biaxially oriented multi-layer laminated film except that the delivery ratio of the layer B to the layer A was changed to 1:1. The characteristic properties of the obtained film are shown in Table 2.

Example 31

The procedure of Example 30 was repeated to obtain a biaxially oriented multi-layer laminated film except that the draw ratio in the longitudinal direction was changed to 5.3 times. The characteristic properties of the obtained film are shown in Table 2.

Example 32

The procedure of Example 24 was repeated to obtain a biaxially oriented multi-layer laminated film except that the delivery ratio of the layer B to the layer A was changed to 1:2. The characteristic properties of the obtained film are shown in Table 2.

Example 33

The procedure of Example 32 was repeated to obtain a biaxially oriented multi-layer laminated film except that the draw ratio in the longitudinal direction was changed to 5.3 times. The characteristic properties of the obtained film are shown in Table 2.

Example 34

The procedure of Example 28 was repeated to obtain a biaxially oriented multi-layer laminated film except that the delivery ratio of the layer B to the layer A was changed to 1:2. The characteristic properties of the obtained film are shown in Table 2.

Example 35

The procedure of Example 34 was repeated to obtain a biaxially oriented multi-layer laminated film except that the draw ratio in the longitudinal direction was changed to 5.3 times. The characteristic properties of the obtained film are shown in Table 2.

TABLE 2

| | Film layer B | | | | film layer A | | | |
|---|---|---|---|---|---|---|---|---|
| | Content of ANA mol % | number of layers layer | Tg ° C. | Tm ° C. | Content of ANA mol % | number of layers | Tg ° C. | Tm ° C. |
| Ex. 12 | 27 | 100 | 117 | 238 | 0 | 101 | 120 | 270 |
| Ex. 13 | 27 | 100 | 117 | 238 | 0 | 101 | 120 | 270 |
| Ex. 14 | 27 | 100 | 117 | 238 | 0 | 101 | 120 | 270 |
| Ex. 15 | 27 | 50 | 117 | 238 | 0 | 51 | 120 | 270 |
| Ex. 16 | 27 | 100 | 117 | 238 | 0 | 101 | 120 | 270 |
| Ex. 17 | 27 | 100 | 117 | 238 | 0 | 101 | 120 | 270 |
| Ex. 18 | 35 | 100 | 116 | 243 | 0 | 101 | 120 | 270 |
| Ex. 19 | 18 | 100 | 117 | 255 | 0 | 101 | 120 | 270 |
| Ex. 20 | 27 | 100 | 117 | 238 | 2 | 101 | 120 | 265 |
| C. Ex. 5 | 27 | 100 | 117 | 238 | 27 | 101 | 117 | 238 |
| C. Ex. 6 | 27 | — | 117 | 238 | | Single layer | | |
| C. Ex. 7 | 0 | 100 | 120 | 270 | 0 | 101 | 120 | 270 |

| | film thickness | | | |
|---|---|---|---|---|
| | thickness ratio layer B/layer A —/— | ratio layer B/all layers % | total number of layers layer | all layers μm |
| Ex. 12 | 2/1 | 67 | 201 | 5.0 |
| Ex. 13 | 1/1 | 50 | 201 | 5.0 |
| Ex. 14 | 4/1 | 80 | 201 | 5.0 |
| Ex. 15 | 2/1 | 67 | 101 | 5.0 |
| Ex. 16 | 2/1 | 67 | 201 | 5.0 |
| Ex. 17 | 2/1 | 67 | 201 | 5.0 |
| Ex. 18 | 2/1 | 67 | 201 | 5.0 |
| Ex. 19 | 2/1 | 67 | 201 | 5.0 |
| Ex. 20 | 2/1 | 67 | 201 | 5.0 |
| C. Ex. 5 | 2/1 | 67 | 201 | 5.0 |
| C. Ex. 6 | — | — | — | 5.0 |
| C. Ex. 7 | 2/1 | 67 | 201 | 5.0 |

| | Characteristic properties of film | | | | | | | |
|---|---|---|---|---|---|---|---|---|
| | Young's modulus (Y) GPa | | humidity expansion coefficient (αh:ppm/ % RH) | | temperature expansion coefficient (αt:ppm/° C.) | tanδ peak temperature ° C. | coating nonuniformity — | curling — |
| | MD | TD | MD | TD | TD | | | |
| Ex. 12 | 6.0 | 8.0 | 7.5 | 5.2 | 2.8 | 140 | ○ | ○ |
| Ex. 13 | 6.0 | 8.1 | 8.7 | 5.9 | 2.3 | 140 | ○ | ○ |
| Ex. 14 | 5.9 | 8.1 | 6.5 | 4.9 | 2.3 | 140 | Δ | ○ |
| Ex. 15 | 6.0 | 7.9 | 7.5 | 5.3 | 3.3 | 140 | ○ | ○ |
| Ex. 16 | 7.6 | 6.1 | 5.6 | 7.3 | 13.3 | 145 | ○ | ○ |
| Ex. 17 | 5.3 | 8.6 | 8.5 | 4.6 | 0.0 | 138 | ○ | ○ |
| Ex. 18 | 6.0 | 8.0 | 6.3 | 4.7 | 2.8 | 140 | ○ | ○ |
| Ex. 19 | 6.0 | 8.0 | 8.0 | 6.0 | 2.8 | 140 | ○ | ○ |
| Ex. 20 | 6.0 | 8.0 | 7.3 | 5.0 | 2.8 | 139 | ○ | ○ |
| C. Ex. 5 | 5.8 | 8.5 | 5.6 | 4.4 | 0.5 | 125 | X | ○ |
| C. Ex. 6 | 5.8 | 8.5 | 5.6 | 4.4 | 0.5 | 125 | X | ○ |
| C. Ex. 7 | 5.5 | 9.5 | 13.5 | 8.6 | −3.9 | 155 | ○ | ○ |

| | Film layer B | | | | film layer A | | | |
|---|---|---|---|---|---|---|---|---|
| | Content of ANA mol % | number of layers layer | Tg ° C. | Tm ° C. | Content of ANA mol % | number of layers | Tg ° C. | Tm ° C. |
| Ex. 21 | 21 | 24 | 118 | 247 | 0 | 25 | 120 | 270 |
| Ex. 22 | 21 | 24 | 118 | 247 | 0 | 25 | 120 | 270 |
| Ex. 23 | 21 | 24 | 118 | 247 | 0 | 25 | 120 | 270 |
| Ex. 24 | 21 | 24 | 118 | 247 | 0 | 25 | 120 | 270 |
| Ex. 25 | 21 | 24 | 118 | 247 | 0 | 25 | 120 | 270 |
| Ex. 26 | 21 | 24 | 118 | 247 | 0 | 25 | 120 | 270 |
| Ex. 27 | 21 | 24 | 118 | 247 | 0 | 25 | 120 | 270 |
| Ex. 28 | 15 | 24 | 119 | 257 | 0 | 25 | 120 | 270 |
| Ex. 29 | 15 | 24 | 119 | 257 | 0 | 25 | 120 | 270 |
| Ex. 30 | 15 | 24 | 119 | 257 | 0 | 25 | 120 | 270 |
| Ex. 31 | 15 | 24 | 119 | 257 | 0 | 25 | 120 | 270 |
| Ex. 32 | 21 | 24 | 118 | 247 | 0 | 25 | 120 | 270 |
| Ex. 33 | 21 | 24 | 118 | 247 | 0 | 25 | 120 | 270 |

TABLE 2-continued

| | | | | | | | | |
|---|---|---|---|---|---|---|---|---|
| Ex. 34 | 15 | 24 | 119 | 257 | 0 | 25 | 120 | 270 |
| Ex. 35 | 15 | 24 | 119 | 257 | 0 | 25 | 120 | 270 |

| | film thickness | | | |
|---|---|---|---|---|
| | thickness ratio layer B/layer A —/— | ratio layer B/all layers % | total number of layers layer | all layers μm |
| Ex. 21 | 2/1 | 67 | 49 | 5.0 |
| Ex. 22 | 2/1 | 67 | 49 | 5.0 |
| Ex. 23 | 4/1 | 80 | 49 | 5.0 |
| Ex. 24 | 2/1 | 67 | 49 | 5.0 |
| Ex. 25 | 2/1 | 67 | 49 | 5.0 |
| Ex. 26 | 1/1 | 50 | 49 | 5.0 |
| Ex. 27 | 1/1 | 50 | 49 | 5.0 |
| Ex. 28 | 2/1 | 67 | 49 | 5.0 |
| Ex. 29 | 2/1 | 67 | 49 | 5.0 |
| Ex. 30 | 1/1 | 50 | 49 | 5.0 |
| Ex. 31 | 1/1 | 50 | 49 | 5.0 |
| Ex. 32 | 1/2 | 33 | 49 | 5.0 |
| Ex. 33 | 1/2 | 33 | 49 | 5.0 |
| Ex. 34 | 1/2 | 33 | 49 | 5.0 |
| Ex. 35 | 1/2 | 33 | 49 | 5.0 |

| | Characteristic properties of film | | | | | | |
|---|---|---|---|---|---|---|---|
| | Young's modulus (Y) GPa | | humidity expansion coefficient ($\alpha_h$:ppm/ % RH) | | temperature expansion coefficient ($\alpha_t$:ppm/° C.) | tanδ peak temperature | coating nonuniformity | curling |
| | MD | TD | MD | TD | TD | ° C. | — | — |
| Ex. 21 | 5.3 | 9.0 | 10.5 | 3.9 | −1.9 | 146 | ○ | ○ |
| Ex. 22 | 6.5 | 7.5 | 8.3 | 6.4 | 5.1 | 146 | ○ | ○ |
| Ex. 23 | 5.2 | 10.4 | 9.8 | 4.1 | −7.5 | 148 | ○ | ○ |
| Ex. 24 | 5.7 | 8.2 | 10.9 | 6.3 | 1.9 | 150 | ○ | ○ |
| Ex. 25 | 6.3 | 7.0 | 8.3 | 7.5 | 8.2 | 150 | ○ | ○ |
| Ex. 26 | 5.6 | 8.4 | 11.1 | 6.1 | 1.0 | 152 | ○ | ○ |
| Ex. 27 | 6.5 | 7.3 | 9.2 | 7.8 | 6.2 | 152 | ○ | ○ |
| Ex. 28 | 5.4 | 8.3 | 11.2 | 7.1 | 1.4 | 153 | ○ | ○ |
| Ex. 29 | 6.6 | 7.3 | 9.1 | 8.2 | 6.2 | 153 | ○ | ○ |
| Ex. 30 | 5.4 | 8.2 | 11.3 | 6.5 | 1.9 | 153 | ○ | ○ |
| Ex. 31 | 6.7 | 7.3 | 8.8 | 8.7 | 6.6 | 153 | ○ | ○ |
| Ex. 32 | 5.7 | 8.5 | 11.4 | 6.1 | 0.3 | 152 | ○ | ○ |
| Ex. 33 | 6.4 | 7.4 | 8.9 | 7.6 | 5.8 | 152 | ○ | ○ |
| Ex. 34 | 5.8 | 8.1 | 11.5 | 7.1 | 2.2 | 153 | ○ | ○ |
| Ex. 35 | 6.7 | 7.3 | 9.5 | 8.5 | 6.5 | 153 | ○ | ○ |

Ex.: Example
C. Ex.: Comparative Example

In Table 2, the content of ANA means the content of the 6,6'-(alkylenedioxy)di-2-naphthoic acid component based on the total number of moles of all the acid components, Tg means glass transition temperature, and Tm means melting point.

Example 36

A transesterification reaction was carried out between dimethyl terephthalate and ethylene glycol in the presence of titanium tetrabutoxide and then a polycondensation reaction was carried out to obtain a polyethylene-terephthalate pellet comprising 1.5 mol % of a diethylene glycol component based on the total of all the glycol components. 10 wt % of polyether imide was mixed and kneaded with the obtained pellet based on the weight of the composition by a double-screw extruder that rotates to the same direction and repelletized to obtain an aromatic polyester (A-1) for the film layer (A).

Further, an esterification reaction and a transesterification reaction were carried out among dimethyl terephthalate, 6,6'-(ethylenedioxy)di-2-naphthoic acid and ethylene glycol in the presence of titanium tetrabutoxide and then a polycondensation reaction was carried out to obtain an aromatic polyester (B-1) for the film layer (B) which comprised 82 mol % of a terephthalic acid component and 18 mol % of a 6,6'-(alkylenedioxy)di-2-naphthoic acid component based on the total of all the acid components and 98 mol % of an ethylene glycol component and 2 mol % of a diethylene glycol component based on the total of all the glycol components. Crosslinked polystyrene particles having an average particle diameter of 0.25 μm were contained in this aromatic polyester (B-1) to a concentration of 0.1 wt % in the pellet in accordance with a predetermined method.

This aromatic polyester (B-1) had a melting point of 245° C. and a glass transition temperature of 80° C.

The aromatic polyesters (A-1) and (B-1) obtained as described above were dried at 170° C. for 3 hours, supplied into extruders and heated up to 295° C. to be molten. The aromatic polyester (A-1) was first divided to form one layer as an outermost surface layer (layer tX), the rest of the aromatic polyester (A-1) was divided to form 99 layers, the aromatic polyester (B-1) was divided to form 100 layers, the aromatic polyester (A-1) layers and the aromatic polyester (B-1) layers were laminated together alternately by the multi-layer feed block device, and then the outermost surface layer tX was laminated with the resulting laminate. The layer configuration was film layers (A)/(B). (A)/(B). In the obtained biaxially oriented multi-layer laminated polyester film, the thickness of the film layer (A) positioned as an outermost layer (layer tX) was 1,000 nm, the thickness of each of the film layers (A) between the outermost layers was 10 nm, and the thickness of each of the film layers (B) was 30 nm.

The resulting laminate was guided into a die while keeping its laminated state and extruded into a sheet form on a rotating cooling drum having a temperature of 20° C. while it was molten to produce an unstretched multi-layer laminated film consisting of 200 alternating layers made of the aromatic polyester (A-1) and layers made of the aromatic polyester (B-1). The delivery ratio of the film layer B to the film layer A was 3:2. The obtained unstretched multi-layer laminated film was heated with an IR heater from above between two rollers which differed in revolution in the machine direction to ensure that the film surface temperature became 105° C. and stretched to 4.5 times in the longitudinal direction (machine direction) to obtain a monoaxially oriented film. This monoaxially oriented film was guided to a stenter to be stretched to 4.0 times in the transverse direction (crosswise direction) at 125° C. and then heat set at 190° C. for 5 seconds to obtain a biaxially oriented multi-layer laminated film having a thickness of 5 μm. The characteristic properties of the obtained film are shown in Table 3.

The aromatic polyesters (A-2) and (B-2) obtained as described above were dried at 170° C. for 6 hours, supplied into extruders and heated up to 295° C. to be molten. The aromatic polyester (A-2) was first divided to form one layer as an outermost surface layer (layer tX), the rest of the aromatic polyester (A-2) was divided to form 49 layers, the aromatic polyester (B-2) was divided to form 50 layers, the aromatic polyester (A-2) layers and the aromatic polyester (B-2) layers were laminated together alternately by the multi-layer feed block device, and then the outermost surface layer tX was laminated with the resulting laminate. That is, the layer configuration was film layers (A)/(B) . . . (A)/(B). In the obtained biaxially oriented multi-layer laminated polyester film, the thickness of the film layer (A) positioned as an outermost layer (layer tX) was 2,500 nm, the thickness of each of the film layers (A) between the outermost layers was 10 nm, and the thickness of each of the film layers (B) was 24 nm. The resulting laminate was guided into a die while keeping its laminated state and extruded into a sheet form on a rotating cooling drum having a temperature of 50° C. while it was molten to produce an unstretched multi-layer laminated film consisting of 100 alternating layers made of the aromatic polyester (A-2) and layers made of the aromatic polyester (B-2). The delivery ratio of the film layer B to the film layer A was 3:1.2. The obtained unstretched multi-layer laminated film was heated with an IR heater from above between two rollers which differed in revolution in the machine direction to ensure that the film surface temperature became 135° C. and stretched to 5.3 times in the longitudinal direction (machine direction) to obtain a monoaxially oriented film. This monoaxially oriented film was guided to a stenter to be stretched to 7.0 times in the transverse direction (crosswise direction) at 145° C. and then heat set at 205° C. for 5 seconds to obtain a biaxially oriented multi-layer laminated film having a thickness of 4.2 μm. The characteristic properties of the obtained film are shown in Table 3.

Example 37

An esterification reaction and a transesterification reaction were carried out among dimethyl 2,6-naphthalenedicarboxylate, 6,6'-(ethylenedioxy)di-2-naphthoic acid and ethylene glycol in the presence of titanium tetrabutoxide and then a polycondensation reaction was carried out to obtain an aromatic polyester (B-4) for the film layer (B) which comprised 80 mol % of a 2,6-naphthalenedicarboxylic acid component and 20 mol % of a 6,6'-(alkylenedioxy)di-2-naphthoic acid component based on the total of all the acid components and 98 mol % of an ethylene glycol component and 2 mol % of a diethylene glycol component based on the total of all the glycol components. 0.2 wt % of spherical silica particles having an average particle diameter of 0.3 μm were contained in this aromatic polyester (B-4) based on the weight of the resin composition. Further, a transesterification reaction was carried out between dimethyl 2,6-naphthalenedicarboxylate and ethylene glycol in the presence of titanium tetrabutoxide and then a polycondensation reaction was carried out to obtain polyethylene-2,6-naphthalate which comprised 1.5 mol % of a diethylene glycol component based on the total of all the glycol components as an aromatic polyester (A-2) for the film layer (A). 0.1 wt % of silica particles having an average particle diameter of 0.1 μm were contained in this aromatic polyester (A-2) based on the weight of the resin composition obtained before the polycondensation reaction. This aromatic polyester (A-2) was used for the film layers (A), and the aromatic polyester (A-2) and the aromatic polyester (B-4) were dried at 170° C. for 6 hours and molten by using two extruders. The aromatic polyesters (A-2) and (B-4) were divided before lamination to produce outermost layers, the resin A-2 was divided to form 24 layers, the resin B-4 was divided to form 24 layers, these layers were laminated alternately, and the film layer (A) made of the aromatic polyester (A-2) as the outermost layer and the film layer (B) made of the aromatic polyester (B-4) as the outermost layer were laminated on the surfaces of the film layer (B) and the film layer (A), respectively. That is, the layer configuration was the film layers (A)/(B). (A)/(B). In the obtained biaxially oriented multi-layer laminated polyester film, the thickness of the film layer (A) positioned as an outermost layer was 500 nm, the thickness of the film layer (B) positioned as the other outermost layer was 2,500 nm, and the thickness of each of the film layers (A) and the film layers (B) between the outermost layers was 10 nm. The resulting laminate was guided into a die while keeping its laminated state and extruded into a sheet form on a rotating cooling drum having a temperature of 50° C. while it was molten to produce an unstretched multi-layer laminated film consisting of alternating aromatic polyester (A-2) layers and aromatic polyester (B-4) layers. The obtained unstretched multi-layer laminated film was heated with an IR heater from above between two rollers which differed in revolution in the machine direction to ensure that the film surface temperature became 135° C. and stretched to 5.2 times in the longitudinal direction (machine direction) to obtain a monoaxially oriented film. A coating solution having the following composition was applied to the surface of the film layer (A) positioned as the outermost layer of the obtained monoaxially oriented film to a thickness shown in Table 3, and then the resulting laminate was guided to a stenter to be stretched to 7.0 times in the transverse direction (crosswise direction) at 145° C. and heat set at 210° C. for 4 seconds to obtain a biaxially oriented multi-layer laminated film. The characteristic properties of the obtained film are shown in Table 3.

Composition of Coating Layer:

(1) Acryl-Polyester Resin: 75 wt % polyester component: terephthalic acid (70 mol %), isophthalic acid (18 mol %), 5-sodium sulfoisophthalic acid (12 mol %)/ethylene glycol (92 mol %), diethylene glycol (8 mol %)

acrylic resin component: methyl methacrylate (80 mol %), glycidyl methacrylate (15 mol %), n-butyl acrylate (5 mol %)

molar ratio of polyester component/acrylic resin component=3/7
(2) Acrylic Resin Fine Particles: 5 wt %
  average particle diameter: 20 nm
  volume shape factor: 0.50
(3) Surfactant: 20 wt %
  Nonion NS-240 of NOF Corporation Example 38

An aromatic polyester (A-5) was prepared for the film layer (A) in the same manner as the aromatic polyester (A-1) of Example 36 except that the particles to be contained in the aromatic polyester (A-1) were changed to crosslinked polystyrene particles having an average particle diameter of 0.06 µm. An aromatic polyester (B-5) was prepared for the film layer (B) in the same manner as the aromatic polyester (B-1) of Example 36 except that it comprised 60 mol % of a terephthalic acid component and 40 mol % of a 6,6'-(alkylenedioxy)di-2-naphthoic acid component based on the total of all the acid components and contained 0.2 wt % of spherical silica having an average particle diameter of 0.3 µm in place of crosslinked polystyrene particles.

These aromatic polyesters (A-5) and (B-5) were dried at 170° C. for 4 hours and supplied from two extruders. Then, the aromatic polyester (A-5) was divided to form 41 layers which changed in thickness continuously and had a final thickness of 100 to 5 nm, and the aromatic polyester (B-5) was divided to form 41 layers which changed in thickness continuously and had a final thickness of 20 to 70 nm. These layers were laminated together alternately. That is, the layer configuration was film layers (A: 100 nm)/(B: 20 nm) . . . (A: 5 nm)/B: 70 nm). An unstretched multi-layer laminated film was obtained in the same manner as in Example 36 except that the thickest layer A and the thickest layer B became the outermost layers. A biaxially oriented multi-layer laminated film was obtained in the same manner as in Example 36 except that the obtained unstretched multi-layer laminated film was stretched to 3.1 times in the longitudinal direction and to 6.1 times in the transverse direction. The characteristic properties of the obtained film are shown in Table 3.

Example 39

An aromatic polyester (B-6) was prepared for the film layer (B) in the same manner as the aromatic polyester (B-4) of Example 37 except that it comprised 76 mol % of a 2,6-naphthalenedicarboxylic acid component and 24 mol % of a 6,6-(alkylenedioxy)di-2-naphthoic acid component based on the total of all the acid components and the content of the spherical silica having an average particle diameter of 0.1 µm as the inert particles was changed to 0.1 wt %. An aromatic polyester (A-6) was prepared for the film layer (A) in the same manner as the aromatic polyester (A-2) of Example 37 except that 0.1 wt % of crosslinked polystyrene particles having an average particle diameter of 0.25 µm was used in place of the spherical silica as the inert particles.

These aromatic polyester (A-6) and (B-6) were dried at 170° C. for 6 hours and supplied from two extruders. Then, the aromatic polyester (B-6) was first divided to form one layer as an outermost layer (layer tX), and the rest of the aromatic polyester (B-6) was divided to form 49 layers. Further, the aromatic polyester (A-6) was divided to form 50 layers which were then laminated with the layers (B-6) alternately by using a multi-layer feed block device, and the outermost layer tX was laminated on the resulting laminate. That is, the layer configuration was film layers (B)/(A) . . . (B)/(A). In the obtained biaxially oriented multi-layer laminated film, the thickness of the film layer (B) (layer tX) positioned as the outermost layer was 2,500 nm, the thickness of each of the film layers (B) existent between the outermost layers was 10 nm, and the thickness of each of the film layers (A) was 24 nm.

A biaxially oriented multi-layer laminated film was obtained in the same manner as in Example 37 except that the draw ratio in the longitudinal direction was changed to 5.5 times, the draw ratio in the transverse direction was changed to 7.5 times, a coating layer was not formed, and the film was heat set at 205° C. for 5 seconds. The characteristic properties of the obtained film are shown in Table 3.

Example 40

An aromatic polyester (B-7) was prepared for the film layer (B) in the same manner as the aromatic polyester (B-4) of Example 37 except that it comprised 86 mol % of a 2,6-naphthalenedicarboxylic acid component and 14 mol % of a 6,6'-(alkylenedioxy)di-2-napthhoic acid component based on the total of all the acid components. An aromatic polyester (A-7) was prepared for the film layer (A) in the same manner as the aromatic polyester (A-2) of Example 37 except that it comprised 96 mol % of a 2,6-naphthalenedicarboxylic acid component and 4 mol % of a 6,6'-(alkylenedioxy)di-2-naphthoic acid component based on the total of all the acid components.

The aromatic polyester (A-7) was dried at 170° C. for 6 hours, the aromatic polyester (B-7) was dried at 170° C. for 4 hours, and both of them were supplied from two extruders. Then, the aromatic polyester (A-7) was first divided to form one layer as an outermost layer (layer tX), and the rest of the aromatic polyester (A-7) was divided to form 50 layers. Further, the aromatic polyester (B-7) was divided to form 50 layers which were then laminated with the layers (A-7) alternately by using a multi-layer feed block device, and the outermost layer tX was formed on the surface of the layer (B-7). That is, the layer configuration was film layers (A)/(B) . . . (B)/(A). In the obtained biaxially oriented multi-layer laminated film, the thickness of the film layer (A) (layer tX) positioned as the outermost layer was 2,500 nm, the thickness of each of the film layers (A) existent between the outermost layers and as the other outermost layer was 10 nm, and the thickness of each of the film layers (B) was 24 nm.

A biaxially oriented multi-layer laminated film was obtained in the same manner as in Example 39. The characteristic properties of the obtained film are shown in Table 3.

Example 41

A monoaxially oriented film was obtained in the same manner as in Example 38. A biaxially oriented multi-layer laminated film was obtained in the same manner as in Example 38 except that a coating solution having the following composition was applied to the surface of the film layer (B) positioned as an outermost layer of the obtained monoaxially oriented film to a thickness shown in Table 3. The characteristic properties of the obtained film are shown in Table 3.
Composition of Coating Layer:

| | |
|---|---|
| Copolyester resin | 60 wt % |
| 97 mol % of terephthalic acid/1 mol % of isophthalic acid/2 mol % of 5-sodium sulfoisophthalic acid/60 mol % of ethylene glycol/8 mol % of diethylene glycol | |
| silica particles (average particle diameter of 60 nm) | 10 wt % |
| hydroxypropylmethyl cellulose | 20 wt % |
| Nonion NS-208.5 of NOF Corporation | 10 wt % |

TABLE 3

| | | layer A | | | | layer B | | | |
|---|---|---|---|---|---|---|---|---|---|
| | | Type Type | added component particle diameter | content amount of addition | number of layers | Type Type | added component particle diameter | content amount of addition | number of layers |
| Ex. 36 | Polymer | PET | PEI | 10 wt % | 100 | PET | ANA | 18 mol % | 100 |
| | Added particles | — | — | — | | PS | 0.25 μm | 0.1 wt % | |
| Ex. 37 | Polymer | PEN | — | — | 25 | PEN | ANA | 20 mol % | 25 |
| | Added particles | silica | 0.1 μm | 0.1 wt % | | silica | 0.3 μm | 0.2 wt % | |
| Ex. 38 | Polymer | PET | PEI | 10 wt % | 41 | PET | ANA | 40 mol % | 41 |
| | Added particles | PS | 0.06 μm | 0.02 wt % | | silica | 0.3 μm | 0.2 wt % | |
| Ex. 39 | Polymer | PEN | — | — | 50 | PEN | ANA | 24 mol % | 51 |
| | Added particles | PS | 0.25 μm | 0.1 wt % | | silica | 0.1 μm | 0.1 wt % | |
| Ex. 40 | Polymer | PEN | ANA | 4 mol % | 51 | PEN | ANA | 14 mol % | 50 |
| | Added particles | silica | 0.1 μm | 0.1 wt % | | silica | 0.3 μm | 0.2 wt % | |
| Ex. 41 | Polymer | PET | PEI | 10 wt % | 41 | PET | ANA | 40 mol % | 41 |
| | Added particles | PS | 0.06 μm | 0.02 wt % | | silica | 0.3 μm | 0.2 wt % | |

| | | layer C Polymer Added particles | layer D Type | total thickness μm |
|---|---|---|---|---|
| Ex. 36 | Polymer | — | — | 5 |
| | Added particles | — | — | |
| Ex. 37 | Polymer | — | acryl-modified PES | 3.5 |
| | Added particles | — | 20 nm acryl 5% | |
| Ex. 38 | Polymer | — | — | 4.5 |
| | Added particles | — | — | |
| Ex. 39 | Polymer | — | — | 4.2 |
| | Added particles | — | — | |
| Ex. 40 | Polymer | — | — | 4.2 |
| | Added particles | — | — | |
| Ex. 41 | Polymer | — | co-PES | 4.5 |
| | Added particles | — | 60 nm silica | |

| | | Layer thickness | | | | | | | |
|---|---|---|---|---|---|---|---|---|---|
| | | Layer D nm | tX nm | tX' nm | tA nm | tB nm | tY' nm | tY nm | Layer D nm |
| Ex. 36 | Polymer | — | 1000 | 30 | 10 | 30 | 10 | 30 | — |
| | Added particles | | Layer A | Layer B | | | Layer A | Layer B | |
| Ex. 37 | Polymer | 10 | 500 | 10 | 10 | 10 | 10 | 2500 | — |
| | Added particles | | Layer A | Layer B | | | Layer A | Layer B | |
| Ex. 38 | Polymer | — | 100 | 20 | 50 | 45 | 5 | 70 | — |
| | Added particles | | Layer A | Layer B | | | Layer A | Layer B | |
| Ex. 39 | Polymer | — | 2500 | 24 | 24 | 10 | 24 | 10 | — |
| | Added particles | | Layer B | Layer A | | | Layer A | Layer B | |
| Ex. 40 | Polymer | — | 2500 | 24 | 10 | 24 | 24 | 10 | — |
| | Added particles | | Layer A | Layer B | | | Layer B | Layer A | |
| Ex. 41 | Polymer | — | 100 | 20 | 50 | 45 | 5 | 70 | 15 |
| | Added particles | | Layer A | Layer B | | | Layer A | Layer B | |

| | | surface roughness | | Young's modulus | | CTE | CHE |
|---|---|---|---|---|---|---|---|
| | | Ra X nm | Ra Y nm | MD GPa | TD GPa | TD ppm/°C. | TD ppm/% RH |
| Ex. 36 | Polymer | 2 | 6 | 7 | 6 | 4 | 8 |
| | Added particles | | | | | | |
| Ex. 37 | Polymer | 3 | 7 | 6 | 10 | −3 | 4 |
| | Added particles | | | | | | |
| Ex. 38 | Polymer | 3.5 | 6 | 4.5 | 8.5 | −4 | 4 |
| | Added particles | | | | | | |
| Ex. 39 | Polymer | 2.5 | 6.5 | 7 | 9 | −2 | 4.5 |
| | Added particles | | | | | | |
| Ex. 40 | Polymer | 2.5 | 6.5 | 7 | 9 | −2 | 4.5 |
| | Added particles | | | | | | |
| Ex. 41 | Polymer | 3.5 | 6 | 4.5 | 8.5 | −4 | 4 |
| | Added particles | | | | | | |

TABLE 3-continued

|  |  | tanδ MD °C. | Coating nonuniformity | windability percentage of acceptable products % | electromagnetic conversion characteristics dB | curling |
|---|---|---|---|---|---|---|
| Ex. 36 | Polymer Added particles | 135 | ○ | 80 | +1 | Δ |
| Ex. 37 | Polymer Added particles | 145 | ○ | 75 | +1 | Δ |
| Ex. 38 | Polymer Added particles | 135 | ○ | 70 | ±0 | Δ |
| Ex. 39 | Polymer Added particles | 142 | ○ | 85 | ±0 | Δ |
| Ex. 40 | Polymer Added particles | 152 | ○ | 85 | ±0 | ○ |
| Ex. 41 | Polymer Added particles | 135 | ○ | 90 | ±0 | Δ |

Ex.: Example

In Table 3, PET means polyethylene terephthalate, PEN means polyethylene-2,6-naphthalate, PEI means polyether imide, ANA means a 6,6'-(alkylenedioxy)di-2-naphthoic acid component, PS means crosslinked polystyrene particles, and silica means spherical silica particles. The content in the columns of the layer A and the layer B means the content of PEI or ANA, and the amount of addition means the amount of added inert particles. The acrylic-modified PES in the column of the layer D means the coating layer described in Example 37, and the co-PES in the column of the layer D means the coating layer described in Example 41. The upper row in the column of layer thickness indicates thickness, and the lower row indicates any one of the film layer (A), (B) and (C). CTE means temperature expansion coefficient, CHE means humidity expansion coefficient, and tan δ means a peak temperature in the viscoelasticity measurement.

Examples 42 to 44

A biaxially oriented film was obtained by annealing the biaxially oriented film in the form of a film roll of Example 24 at a temperature shown in Table 4 for a time shown in Table 4. The characteristic properties of the obtained film are shown in Table 4.

The elongation in TMA of each of the biaxially oriented films of Examples 42 to 44 was smaller than that of a biaxially oriented film which was not annealed. Therefore, it can be understood that these films have excellent processing properties so that they can retain suitable coatability even under more strict conditions.

TABLE 4

|  | Annealing | | heat absorption peak | |
|---|---|---|---|---|
|  | Temperature °C. | time hr | temperature $T_K$ °C. | energy $\Delta H_K$ mJ/mg |
| Ex. 24 | — | — | 122 | 0.4 |
| Ex. 42 | 110 | 24 | 123 | 2.2 |
| Ex. 43 | 100 | 24 | 111 | 2.0 |
| Ex. 44 | 95 | 48 | 105 | 1.8 |

| | biaxially oriented polyester film | | | | | |
|---|---|---|---|---|---|---|
| | Young's modulus | | TD | | coating nonuniformity | TMA MD % |
| | MD GPa | TD GPa | temperature expansion coefficient ppm/°C. | humidity expansion coefficient ppm/RH % | | |
| Ex. 24 | 5.7 | 8.2 | 1.9 | 6.3 | ○ | 1.6 |
| Ex. 42 | 5.9 | 8.2 | 1.7 | 6.9 | ○ | 0.4 |
| Ex. 43 | 5.8 | 8.4 | 0.9 | 6.6 | ○ | 0.5 |
| Ex. 44 | 5.8 | 8.3 | 1.4 | 6.7 | ○ | 0.6 |

Ex.: Example

Effect of the Invention

The biaxially oriented laminated film of the present invention has small dimensional changes against humidity changes and is useful as a base film for high-density magnetic recording media. The biaxially oriented laminated film of the present invention has small dimensional changes against temperature changes and is useful as a base film for high-density magnetic recording media. Further, even when the biaxially oriented laminated film of the present invention is dried by heating at about 120° C. after a magnetic layer is formed thereon, it rarely elongates in the traveling direction. As a result, its shrinkage caused by cooling is suppressed, whereby it rarely creases and the coating nonuniformity of the magnetic layer is rare. The biaxially oriented laminated film of the present invention rarely curls. The biaxially oriented laminated film of the present invention is excellent in surface properties and windability.

INDUSTRIAL APPLICABILITY

Since the biaxially oriented laminated film of the present invention has excellent dimensional stability and rarely elongates during processing at a high temperature, it can be used for various purposes and advantageously used as a base film for high-density magnetic recording media in particular.

The invention claimed is:

1. A biaxially oriented laminated film comprising a film layer (A) made of an aromatic polyester (A) and a film layer (B) made of an aromatic polyester (B), wherein
the content of a 6,6'-(alkylenedioxy)di-2-naphthoic acid component represented by the following formula (I) based on the total of all the acid components is less than 5 mol % in the aromatic polyester (A) and not less than 5 mol % and less than 50 mol % in the aromatic polyester (B);
the thickness of the film layer (B) is 50 to 95% of the total thickness of the laminated film; and
the peak temperature of tan δ on a high temperature side is 135° C. or higher when viscoelasticity is measured in the machine direction

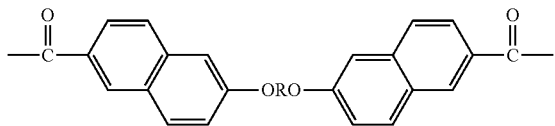

(in the formula (I), R is an alkylene group having 1 to 10 carbon atoms).

2. The laminated film according to claim 1, wherein the dicarboxylic acid components of the aromatic polyester (B) include not less than 5 mol % and less than 50 mol % of the acid component represented by the formula (I) and more than 50 mol % and not more than 95 mol % of a 2,6-naphthalenedicarboxylic acid component.

3. The laminated film according to claim 1, wherein the dicarboxylic acid components of the aromatic polyester (A) include less than 5 mol % of the acid component represented by the formula (I) and more than 95 mol % of a 2,6-naphtalenedicarboxylic acid component.

4. The laminated film according to claim 1, wherein R in the formula (I) is an ethylene group.

5. The laminated film according to claim 1, wherein the aromatic polyesters (A) and (B) comprise 90 to 100 mol % of an ethylene glycol component based on the total of all the glycol components.

6. The laminated film according to claim 1, wherein the film layer (A) is formed on one side of the film layer (B).

7. The laminated film according to claim 1, wherein the film layer (A) is formed on both sides of the film layer (B).

8. The laminated film according to claim 1 which has 11 or more alternating film layers (A) and film layers (B).

9. The laminated film according to claim 8, wherein the laminated film has a first surface layer, inner layers and a second surface layer, each composed of the film layer (A) or the film layer (B), the surface roughness (R aX) of the first surface layer is 0.5 to 5 nm, and the surface roughness (R aY) of the second surface layer is 1 nm or more larger than RaX and not more than 10 nm.

10. The laminated film according to claim 9, wherein one of the film layer (A) and the film layer (B) forms both of the first surface layer and the second surface layer, (i) the inner layers contain 0.001 to 5 wt % of inert particles having an average particle diameter of 0.01 to 1.0 μm, (ii) the first surface layer and the second surface layer do not contain inert particles, contain particles having a smaller average particle diameter than that of the inner layers, or contain a smaller amount of inert particles having the same average particle diameter than in the inner layers, and (iii) the thickness (tX) of the first surface layer is 1.5 times or more larger than the thickness (tY) of the second surface layer.

11. The laminated film according to claim 9, wherein one of the film layer (A) and the film layer (B) forms the second surface layer and the other forms the first surface layer, (i) the second surface layer contains 0.001 to 5 wt % of inert particles having an average particle diameter of 0.01 to 1.0 μm, and (ii) the first surface layer does not contain inert particles, contains inert particles having a smaller average particle diameter than that of the second surface layer, or contains a smaller amount of inert particles having the same average particle diameter than in the second surface layer.

12. The laminated film according to claim 11, wherein the thickness (tX (nm)) of the first surface layer, the thickness (tY (nm)) of the second surface layer, the thickness (tX' (nm)) of a film layer adjacent to the first surface layer and the thickness (tY' (nm)) of a film layer adjacent to the second surface layer satisfy at least one of the following relational expressions $$tX > 1.5 \times tX' \quad \text{(expression 1)}$$

$$tY > 1.5 \times tY'. \quad \text{(expression 2)}$$

13. The laminated film according to claim 9, wherein the laminated film has a third surface layer (layer C) containing 0.001 to 5 wt % of inert particles having an average particle diameter of 0.01 to 1.0 μm on the second surface layer or in place of the second surface layer, and the first surface layer and the inner layers do not contain inert particles, contain particles having a smaller average particle diameter than that of the layer C, or contain a smaller amount of inert particles having the same average particle diameter than in the layer C.

14. The laminated film according claim 9 which has a fourth surface layer (layer D) containing inert particles and formed of a coating film on the first surface layer and/or the second surface layer.

15. The laminated film according to claim 13, wherein the inner layers do not contain inert particles.

16. The laminated film according to claim 9 which has a thickness of 1 to 10 μm.

17. The laminated film according to claim 1 which is used as a base film for magnetic recording media.

* * * * *